(12) United States Patent
Fredlund et al.

(10) Patent No.: US 8,150,807 B2
(45) Date of Patent: Apr. 3, 2012

(54) IMAGE STORAGE SYSTEM, DEVICE AND METHOD

(75) Inventors: John R. Fredlund, Rochester, NY (US); Richard G. Mackson, Pittsford, NY (US); Michael Venturino, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 727 days.

(21) Appl. No.: 11/866,615

(22) Filed: Oct. 3, 2007

(65) Prior Publication Data
US 2009/0094247 A1    Apr. 9, 2009

(51) Int. Cl.
*G06F 17/30* (2006.01)
(52) U.S. Cl. ...................................... 707/634
(58) Field of Classification Search .................... 707/634
See application file for complete search history.

(56) References Cited

U.S. PATENT DOCUMENTS

| | | | |
|---|---|---|---|
| 5,550,646 A | 8/1996 | Hassan et al. | |
| 5,572,235 A * | 11/1996 | Mical et al. | 345/600 |
| 5,649,185 A * | 7/1997 | Antognini et al. | 726/2 |
| 5,666,215 A | 9/1997 | Fredlund et al. | |
| 5,760,917 A | 6/1998 | Sheridan | |
| 5,802,220 A | 9/1998 | Black et al. | |
| 5,832,464 A | 11/1998 | Houvener et al. | |
| 6,004,061 A | 12/1999 | Manico et al. | |
| 6,154,772 A | 11/2000 | Dunn et al. | |
| 6,182,133 B1 | 1/2001 | Horvita | |
| 6,301,607 B2 | 10/2001 | Barraclough et al. | |
| 6,304,277 B1 * | 10/2001 | Hoekstra et al. | 345/600 |
| 6,366,907 B1 | 4/2002 | Fanning et al. | |
| 6,509,910 B1 | 1/2003 | Agarwal et al. | |
| 6,535,228 B1 | 3/2003 | Bandaru et al. | |

(Continued)

FOREIGN PATENT DOCUMENTS
WO      2004/104759      12/2004
(Continued)

OTHER PUBLICATIONS

Clarke, I., Sandberg, O., Wiley, B., and Hong, T. W. 2001. Freenet: a distributed anonymous information storage and retrieval system. In international Workshop on Designing Privacy Enhancing Technologies: Design Issues in Anonymity and Unobservability (Berkeley, California, United States). H. Federrath, Ed. Springer-Verlag New York, New York, NY.*

*Primary Examiner* — Mark Andrew X Radtke
(74) *Attorney, Agent, or Firm* — Roland R. Schindler; Raymond L. Owens

(57) ABSTRACT

An image sharing system, an image sharing device and a method for operating a plurality of image sharing devices are provided. Each image sharing device has a memory with image content files stored therein and a communication system to provide an image sharing system. The method comprises the steps of: identifying image sharing devices to be included in the image sharing system; establishing a communication link between the identified image sharing devices, said communication link providing the ability to transfer image content files; identifying sharable image content files in each of the image sharing devices; and determining manifest data useable in copying the sharable image content files from one of the image sharing devices to at least one other of the image sharing devices so that each of the shareable image content file is stored in at least two of the image sharing devices in the image sharing system.

16 Claims, 17 Drawing Sheets

U.S. PATENT DOCUMENTS

| | | | |
|---|---|---|---|
| 6,574,742 B1* | 6/2003 | Jamroga et al. | 713/400 |
| 6,629,104 B1 | 9/2003 | Parulski et al. | |
| 6,662,198 B2* | 12/2003 | Satyanarayanan et al. | 1/1 |
| 6,678,703 B2* | 1/2004 | Rothschild et al. | 1/1 |
| 6,721,952 B1 | 4/2004 | Guedalia et al. | |
| 6,757,684 B2 | 6/2004 | Svendsen et al. | |
| 6,877,016 B1* | 4/2005 | Hart et al. | 1/1 |
| 6,957,221 B1* | 10/2005 | Hart et al. | 1/1 |
| 7,051,052 B1* | 5/2006 | Shapiro et al. | 707/610 |
| 7,051,173 B2* | 5/2006 | Tsuchiya et al. | 711/162 |
| 7,103,619 B1* | 9/2006 | Rajpurkar et al. | 1/1 |
| 7,158,692 B2* | 1/2007 | Chalana et al. | 382/294 |
| 7,200,626 B1* | 4/2007 | Hoang et al. | 1/1 |
| 7,263,537 B1* | 8/2007 | Lin et al. | 707/639 |
| 7,336,775 B2* | 2/2008 | Tanaka et al. | 379/93.17 |
| 7,392,295 B2* | 6/2008 | Yuan et al. | 709/217 |
| 7,411,693 B2* | 8/2008 | Loukipoudis et al. | 358/1.15 |
| 7,433,903 B1* | 10/2008 | Shapiro et al. | 1/1 |
| 7,555,620 B1* | 6/2009 | Manley | 711/162 |
| 7,561,310 B2* | 7/2009 | Joyce | 358/462 |
| 7,660,413 B2* | 2/2010 | Partovi et al. | 380/33 |
| 7,702,821 B2* | 4/2010 | Feinberg et al. | 710/13 |
| 7,703,012 B2* | 4/2010 | Park et al. | 715/249 |
| 7,756,892 B2* | 7/2010 | Levy | 707/781 |
| 7,774,495 B2* | 8/2010 | Pabla et al. | 709/238 |
| 7,796,779 B1* | 9/2010 | Strong et al. | 382/100 |
| 7,881,192 B2* | 2/2011 | Sultan et al. | 370/230 |
| 2001/0013102 A1* | 8/2001 | Tsuchiya et al. | 714/6 |
| 2001/0051881 A1* | 12/2001 | Filler | 705/3 |
| 2002/0016718 A1* | 2/2002 | Rothschild et al. | 705/2 |
| 2002/0019751 A1* | 2/2002 | Rothschild et al. | 705/3 |
| 2002/0052885 A1* | 5/2002 | Levy | 707/200 |
| 2002/0087546 A1 | 7/2002 | Slater et al. | |
| 2002/0112001 A1 | 8/2002 | Sutherland et al. | |
| 2002/0188735 A1* | 12/2002 | Needham et al. | 709/229 |
| 2003/0009527 A1 | 1/2003 | McIntyre et al. | |
| 2003/0046260 A1* | 3/2003 | Satyanarayanan et al. | 707/1 |
| 2003/0065922 A1 | 4/2003 | Fredlund et al. | |
| 2003/0117651 A1 | 6/2003 | Matraszek et al. | |
| 2003/0122839 A1 | 7/2003 | Matraszek et al. | |
| 2003/0128389 A1 | 7/2003 | Matraszek et al. | |
| 2003/0131002 A1* | 7/2003 | Gennetten et al. | 707/10 |
| 2003/0135793 A1 | 7/2003 | Craig et al. | |
| 2003/0156304 A1 | 8/2003 | Fedorovskaya et al. | |
| 2003/0165269 A1 | 9/2003 | Fedorovskaya et al. | |
| 2003/0165270 A1 | 9/2003 | Endrikhovski et al. | |
| 2003/0174872 A1* | 9/2003 | Chalana et al. | 382/128 |
| 2003/0214670 A1* | 11/2003 | Ohmura | 358/1.15 |
| 2004/0100567 A1 | 5/2004 | Miller et al. | |
| 2004/0101178 A1 | 5/2004 | Fedorovskaya et al. | |
| 2004/0101212 A1 | 5/2004 | Fedorovskaya et al. | |
| 2004/0103111 A1 | 5/2004 | Miller et al. | |
| 2004/0122918 A1 | 6/2004 | Fredlund et al. | |
| 2004/0126038 A1* | 7/2004 | Aublant et al. | 382/305 |
| 2004/0162871 A1* | 8/2004 | Pabla et al. | 709/201 |
| 2004/0172451 A1 | 9/2004 | Biggs et al. | |
| 2005/0066219 A1 | 3/2005 | Hoffman et al. | |
| 2005/0069107 A1* | 3/2005 | Tanaka et al. | 379/93.17 |
| 2005/0129385 A1 | 6/2005 | Speasl et al. | |
| 2005/0132288 A1 | 6/2005 | Kirn et al. | |
| 2005/0134688 A1 | 6/2005 | Belz et al. | |
| 2005/0135708 A1* | 6/2005 | Joyce | 382/306 |
| 2005/0141477 A1* | 6/2005 | Tomita et al. | 370/349 |
| 2005/0203771 A1* | 9/2005 | Achan | 705/2 |
| 2005/0286883 A1* | 12/2005 | Abe et al. | 396/266 |
| 2006/0080286 A1 | 4/2006 | Svendsen | |
| 2006/0082809 A1* | 4/2006 | Loukipoudis et al. | 358/1.15 |
| 2006/0083442 A1* | 4/2006 | Loukipoudis et al. | 382/305 |
| 2006/0098668 A1* | 5/2006 | Dona | 370/401 |
| 2006/0159109 A1* | 7/2006 | Lamkin et al. | 370/401 |
| 2006/0161635 A1* | 7/2006 | Lamkin et al. | 709/217 |
| 2006/0230072 A1* | 10/2006 | Partovi et al. | 707/104.1 |
| 2007/0047950 A1 | 3/2007 | Asami et al. | |
| 2007/0067373 A1* | 3/2007 | Higgins et al. | 707/206 |
| 2007/0097436 A1 | 5/2007 | Hirata | |
| 2007/0279499 A1* | 12/2007 | Takeshita | 348/231.6 |
| 2007/0291303 A1* | 12/2007 | Tanaka et al. | 358/1.15 |
| 2008/0063384 A1* | 3/2008 | Tanaka et al. | 386/125 |
| 2008/0147821 A1* | 6/2008 | Dietrich et al. | 709/216 |
| 2008/0168559 A1* | 7/2008 | Touitou et al. | 726/23 |
| 2008/0177994 A1* | 7/2008 | Mayer | 713/2 |
| 2008/0307175 A1* | 12/2008 | Hart et al. | 711/162 |

FOREIGN PATENT DOCUMENTS

| | | |
|---|---|---|
| WO | 2005/050413 | 6/2005 |
| WO | 2006/053830 | 5/2006 |

* cited by examiner

IMAGE STORAGE SYSTEM, DEVICE AND METHOD

FIELD OF THE INVENTION

The present invention relates to the field of file sharing and, in particular to image content file sharing.

BACKGROUND OF THE INVENTION

Digital imaging capture and storage continues to increase in popularity and is now the dominant form of consumer image capture, processing and storage in most major commercial markets. However, the challenges associated with successfully storing such image content files remains. Generally consumers entrust their digital image content files to the hard drive of their computer. Unlike the shoebox full of prints, hard drives are unforgiving. Frequently, when the hard drive fails, the options for restoration of files are limited at best. Backing up on removable media is no better. Compact disks, memory cards, and jump drives all have a finite life. In most cases, the options for restoration of lost files are nonexistent. The prints in the shoebox may fade, or become ripped or worn along the way, but those perfect digital image content files are completely gone when their storage medium fails.

Many attempts have been made to combat this problem. Redundant arrays of independent disks (RAID) systems use redundant copies of files on separate disks within a server or server farm for safety. The odds of more than one disk failing at any particular moment in time are very small. Thus when a single drive fails, it is replaced with a new blank drive and the files it held are replicated from the other drives. The multiple drives and disk health monitoring software used in such an arrangement can be expensive.

Commercial records are backed up on a regular basis. At regular intervals, files are moved to media such as CDs or tape. This collection of files is representative of the records at a particular point in time is stored for some length of time, depending upon the type of records. This can lead to very large, costly, and cumbersome storage facilities.

An additional need for long-term storage is to migrate data. Every so often, storage hardware and/or media type and/or file formats become obsolete. Before any of these become completely obsolete, it is necessary to migrate data to a current model of hardware and/or media and/or file format. The timing of the decision to migrate data is often a difficult one for the user. To migrate too soon adds unnecessarily to the cost of storage. To migrate too late means that files are no longer accessible. It also calls for conscious action on the part of the user.

SUMMARY OF THE INVENTION

An image sharing system, an image sharing device and a method for operating a plurality of image sharing devices are provided. Each image sharing device has a memory with image content files stored therein and a communication system to provide an image sharing system. In one embodiment, the method comprises the steps of: identifying image sharing devices to be included in the image sharing system; establishing a communication link between the identified image sharing devices, said communication link providing the ability to transfer image content files; identifying sharable image content files in each of the image sharing devices; and determining manifest data useable in copying the sharable image content files from one of the image sharing devices to at least one other of the image sharing devices so that each of the sharable image content file is stored in at least two of the image sharing devices in the image sharing system.

The sharable image content files are automatically copied from one of the image sharing devices to at least one other of the image sharing devices according to the manifest data; index data is created indicating the at least two image sharing devices in which each sharable image content file is stored.

Subsequently, the content of each of the image sharing devices is monitored to identify any image sharing device that has a sharable image content stored therein that differs from the sharable image content that the index data indicates should be stored in the image sharing device; and copying image content files from other image sharing devices with the copied image content being selected so that each shared image content file in the index data is stored in at least two of the image sharing devices.

DETAILED DESCRIPTION OF THE INVENTION

Figure 1:
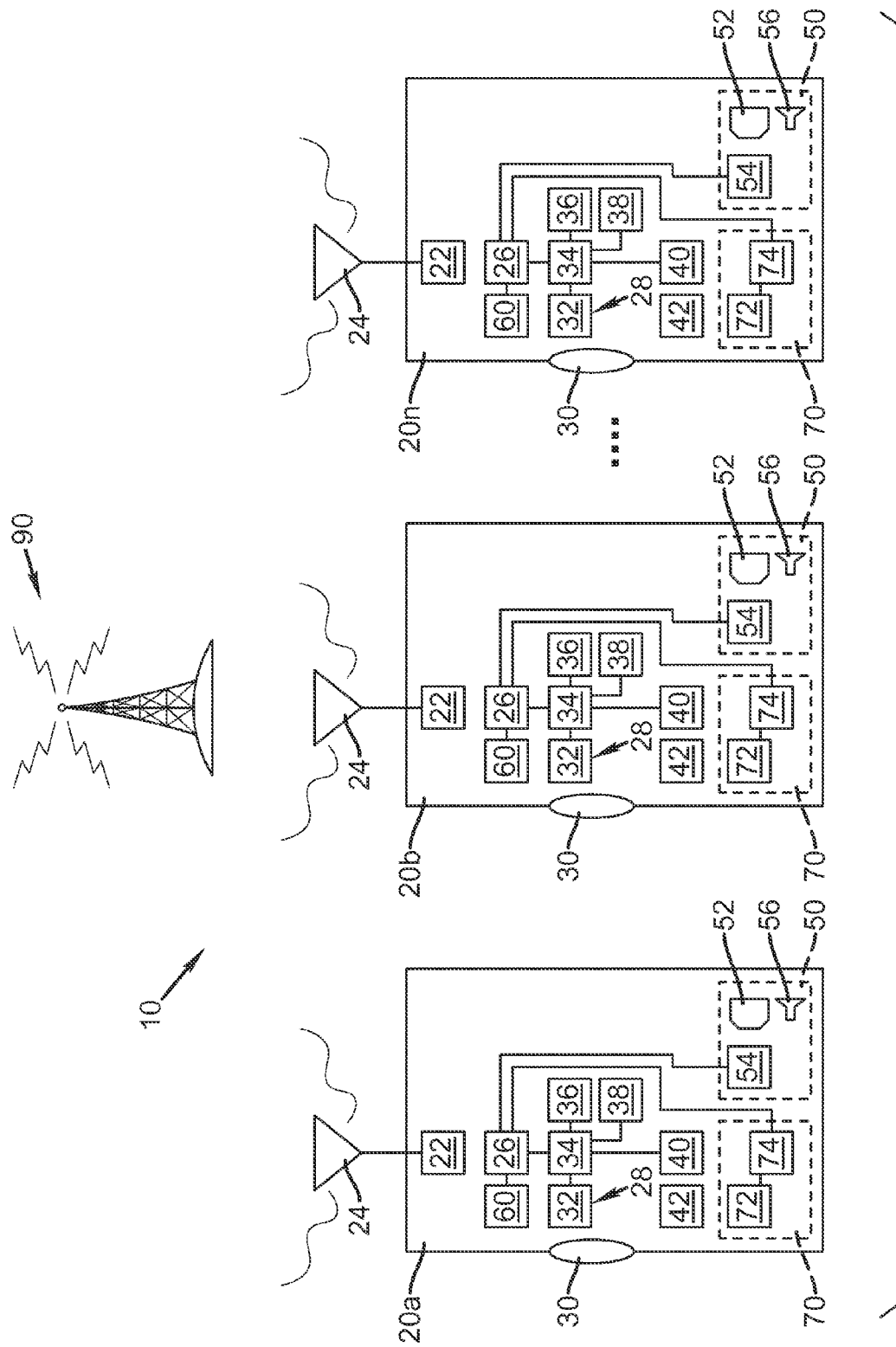
FIG. 1 shows a block diagram of one embodiment of a communication system.

Turning now to FIG. 1, a block diagram of one embodiment of an image sharing system 10 is shown. In this embodiment, a plurality of image sharing devices 20a-20n are provided each having a similar set of operative systems. Such similarity is provided for the purpose of simplifying discussion and it will be appreciated that there can be large variations in the operative systems used in various types of image sharing devices 20a-20n so long as such image sharing devices are capable of performing the functions and steps that are described herein.

In this embodiment, each of image sharing devices 20a-20n has a transceiver 22 that is adapted to cooperate with an antenna 24 to transmit and receive radio frequency signals carrying digital data containing text, audio and video communications. In one useful embodiment, a radio-frequency transceiver 22 is adapted to communicate using the high rate consumer wireless communication standard defined in Institute of Electrical and Electronic Engineers standard IEEE 802.15.3. In other embodiments transceiver 22, can be adapted to communicate using the standards set forth in Institute of Electrical and Electronic Engineers standard IEEE 802.11b. Alternatively, radio transceiver 22 can employ any useful radio frequency communication scheme to send and receive data.

Transceiver 22 can be adapted to transmit communication signals directly to transceivers 22 in others of the image sharing devices 20a-20n. Alternatively, transceiver 22 can transmit signals to others of the image sharing devices 20a-20n by way of a separate intermediary 90 such as, for example, and without limitation a cellular tower, a web site, a data server, a satellite system, wireless repeater, wide area network, wireless router, or by way of other image sharing devices. Such an intermediary 90 can be a passive or reactionary intermediary, or it can actively be involved in the communication process, and in this regard, it can have a display or other output and/or a user input as desired for allowing review of images or for other purposes.

Transceiver 22 is also adapted to cooperate with antenna 24 to receive digital radio frequency signals from other devices. The digital radio frequency data is converted into digital data. The digital data is transferred to controller 26 and converted into digital data.

Transceiver 22 can also use other forms of wired or wireless communication as are compatible with the purposes described herein including, but not limited to, Ethernet or other wired or optical fiber networks, optical type communication systems such as the Infrared Data Associate Standards.

As is shown in FIG. 1, image sharing devices 20a-20n have a controller 26. Controller 26 can comprise, for example, a general-purpose programmable microprocessor such as a Pentium microprocessor sold by Intel Corp. of San Jose, Calif., U.S.A., a microcontroller, or any other control device adapted to control the operation of the image sharing devices 20a-20n in which it is installed. In the embodiment shown, controller 26 is adapted to prepare data representing the content of communications to convey the data to radio transceiver 22 and to cause radio transceiver 22 to transmit data. In addition, controller 26 is adapted to receive signals containing data from radio transceiver 22 and to process this data for use as described herein.

In the embodiment of FIG. 1, image sharing devices 20a-20n are shown incorporating an optional imaging system 28. Imaging system 28 comprises an optional lens system 30, an optional image sensor 32, an optional image processor 34, an optional display driver 40 and an optional video display 42. Images are captured by passing light from a scene through lens system 30. This light is focused on image sensor 32. Image sensor 32 forms an electronic signal that is representative of the light that is focused on image sensor 32. Image sensor 32 can take on a variety of forms. For example, charge coupled devices can be used, as can complementary metal oxide based sensors and charge injection devices. Other imaging technologies can also be used for image sensor 32. Images that are captured by image sensor 32 are transmitted as electronic signals to an image processor 34. Image processor 34 is adapted to receive electronic signals from image sensor 32 and to convert the electronic signal into digital data representing the image captured by image sensor 32.

The digital data representing the image is converted into an image content file. As used herein, the term image content file denotes any form of data that preserves a record that can be reproduced visually and includes, but is not limited, to video streams, video data, sequences of still images, still images, graphical icons, text or other forms of such information. The image content file can then be transferred to a memory 36 which can comprise, for example and without limitation, a semiconductor memory such as a Flash Memory or other form of Random Access Memory, a magnetic memory such as a disk drive or an optical memory such as a compact disk or digital video disk.

The digital data representing the image can also be transmitted to a display driver 40 which converts the digital data into signals that cause a video display 42 such as a liquid crystal display or organic light emitting diode display to present the captured image to the user. Digital data representing the image can also be provided to transceiver 22. Typically, this is done by providing the image content file to transceiver 22. Transceiver 22 converts the digital data into a digital radio frequency signal which is transmitted using antenna 24.

Transceiver 22 also receives digital radio frequency signals from other of image sharing devices 20a-20n containing image content files or other digital data by way of antenna 24. The digital data is transferred to controller 26 and converted into digital image data. Such digital image data is stored in memory 36. In embodiments having a video display, such digital image data can be transferred to display driver 40 and converted into images that are viewable on video display 42.

Imaging system 28 can optionally also be used for displaying a wide variety of images including still images, motion video, sequences of still images icons and text images on video display 42. The presented images can comprise image content files and can also comprise other images or image components that indicate the status of the image sharing device. Imaging system 28 can also be used to also display the content of communications such as text and iconic messages received from other of image sharing devices 20a-20n or from other sources.

One or more of the components of imaging system 28 can be integrated onto a single silicon substrate. For example, image sensor 32 can be formed on a semiconductor having a "camera on chip" type architecture wherein a single semiconductor substrate provides structures to perform image sensing, image processing, image storage functions. One example of such a camera on a chip is the OVT7635 Camera Chip™ sold by Omnivision Technologies of Santa Clara, Calif., U.S.A. An alternative example of a camera-on-a-chip architecture found in the COACH LC and COACH II image processors sold by Zoran Corp. of Santa Clara, Calif., U.S.A., which incorporate image processing, memory, memory management, display control and other functions on a single substrate. In this way, the cost and complexity of image sharing devices 20a-20n can be reduced.

In the embodiment of FIG. 1, image sharing devices 20a-20n are also shown having sensors 38. Sensors 38 can comprise any known form of sensor and can be used, for example, to monitor conditions that are relevant to the operation of image sharing device 10 including, but not limited to, power supply status, signal strength of wireless signals, location information signals from which location information can be obtained, or information regarding the user of the image sharing device.

Each of image sharing devices 20a-20n is also shown as having an optional audio system 50. Audio system 50 is adapted generate audio signals based upon signals from controller 26 and, optionally, as shown can also be adapted to capture audio signals and to generate digital data based upon such signals. In the embodiment shown, sound input is entered by way of microphone 52. Microphone 52 converts acoustical energy from the sound input into an electronic signal. This electronic signal is transmitted to analog to digital (A/D) converter 54 that renders digital signals representing the sound. Controller 26 receives the digital signals representing the sound. Controller 26 processes these signals for storage in memory 36 or for use by radio transceiver 22.

Radio frequency signals containing audio data are received by radio transceiver 22. Radio transceiver 22 extracts digital data from radio frequency signals and provides this digital data to controller 26. As will be discussed in greater detail below, controller 26 processes this data if necessary and provides a stream of digital audio data to A/D converter 54. A/D converter 54 converts the data into an analog signal that is provided to speaker 56 which in turn converts the analog signal into acoustical energy.

In the embodiment of FIG. 1, image sharing devices 20a-20n are each shown having an optional user interface 60 that permits a user to encode numbers, text, and other forms of communication into electronic signals that are transmitted to controller 26. User interface 60 can comprise any known transducer for converting a user action into a signal that can be transmitted to controller 26. Examples of such a transducer include, but are not limited to, a switch, dial, stylus, mouse, joystick, potentiometer, visible or non-visible light sensor or imager. User interface 60 can be combined with display 42 in the form of a touch screen or like device. Controller 26 converts signals from user interface 60 into digital data which can then be used to control the operation of the image sharing device, transmitted using transceiver 22, stored in memory 36 and/or displayed on display driver 40 or put to other use.

It will be appreciated that an image sharing devices 20a-20n can be acquired in a form that is adapted for use as described herein or that it can be received in a generic form and adapted for service in any manner described herein, such as by being programmed for such use. Image sharing devices 20a-20n can be bought or rented, or otherwise made available for use using any known commercial business model.

Figure 2:
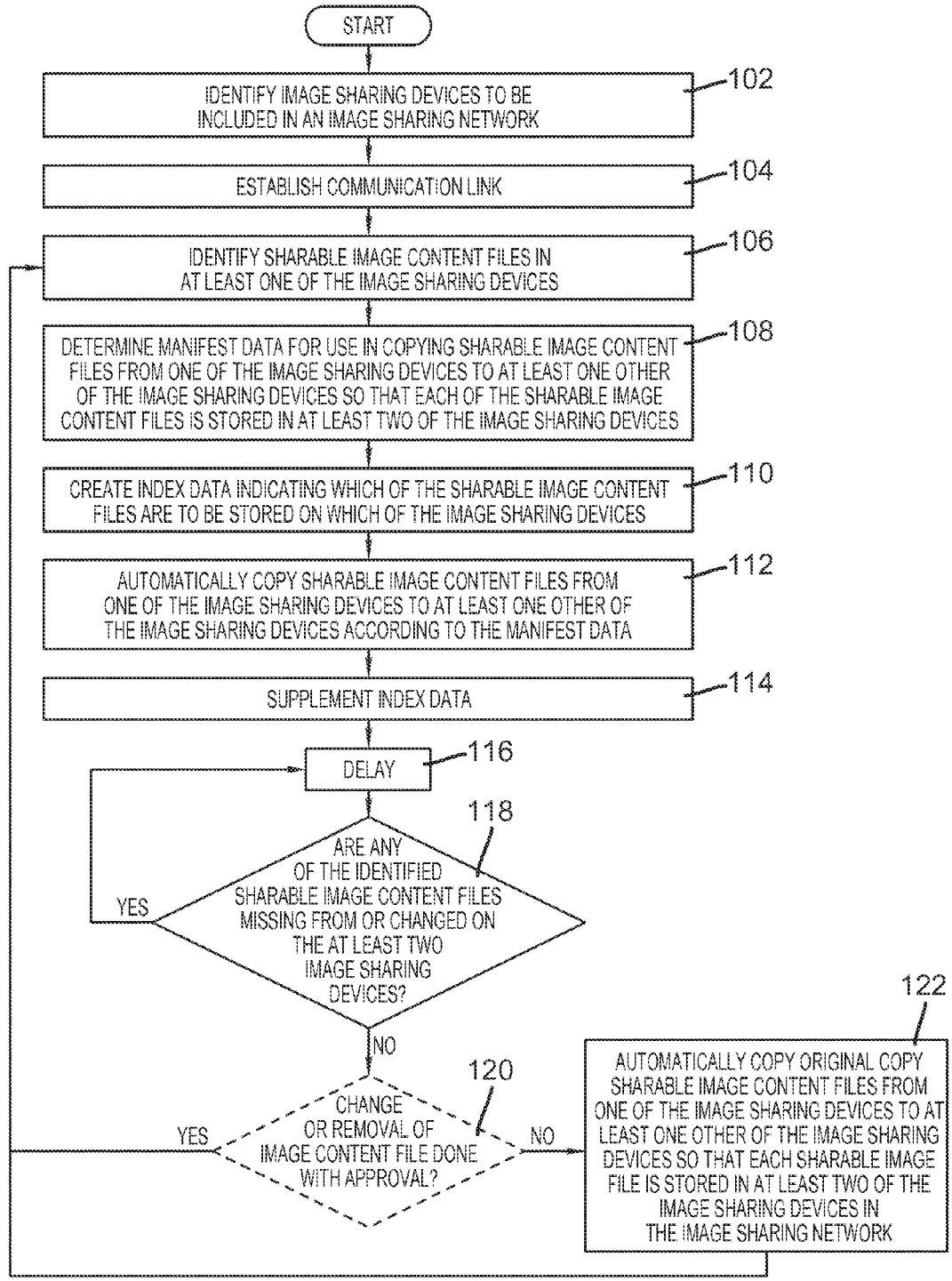
FIG. 2 shows a block diagram of one embodiment of a method for establishing an image sharing system using image sharing devices.

FIG. 2 shows a block diagram of one embodiment of a method for operating a plurality of image sharing devices 20a-20n each having a memory with image content files stored therein and a communication system to provide an image sharing system 10.

In a first step of the method, image sharing devices 20a-20n to be included in image sharing system 10 are identified (step 102). This can be done using any known method for identifying devices to be included in any known form of communication network. In one example embodiment, image sharing devices 20a-20n to be included in image sharing system 10 can be identified by manually compiling a list of addresses or other identification information necessary to allow image sharing devices 20a-20n in image sharing system 10 to exchange images. An "Online Pal List" like a so-called "buddy list" of the type conventionally used in on-line Instant Messaging could constitute one example of such an address list. In certain embodiments, direct communication between image sharing devices 20a-20n may be possible such as where all of image sharing devices 20a-20n use a common type of communication protocol. For example, where all of image sharing devices 20a-20n are Bluetooth enabled and are within range of each other then communication between image sharing devices 20a-20n in image sharing system 10 can be made. Alternatively, communications may be made by way of an intermediary 90 as discussed above with the intermediary 90 acting in this example as a conduit for data communications between image sharing devices 20a-20n in the image sharing system and can additionally act as keeper of index data 94.

The image sharing devices to be included in image sharing system 10 can also be identified in other ways. For example, and without limitation, it is noted that in the embodiment of FIG. 1, image sharing devices 20a-20n are shown equipped with an optional contact detection system 70 that can be used to help identify image sharing devices 20a-20n to be included in an image sharing system 10. In the specific example illustrated in FIG. 1, optional contact detection system is shown having a contact surface 72 and a contact circuit 74. Each contact circuit 74 registers contact between the contact surface 72 of one of image sharing devices 20a-20n and the contact surface 72 of at least one other one of image sharing devices 20a-20n. When such contact is registered, each contact circuit 74 transmits a signal to its respective controller 26 indicating that such contact has been made. Each controller 26 of each contacted image sharing device 20a-20n then determines that the other ones of image sharing devices 20a-20n that have been contacted are to be included in image sharing system 10.

Contact circuit 74 can detect contact between a contact surface 72 to which it is connected and another contact surface 72 of another image sharing device 20a-20n in a variety of ways. For example, where contact surface 72 and the other contact surface are electrically conductive, each contact circuit 74 can cause an electro-magnetic field to form on contact surface 72. When contact surface 72 is in contact with another contact surface, the electromagnetic fields combine. By monitoring the intensity, waveform, or signal content on each contact surface 72 each contact circuit 74 can detect when contact surface 72 is in contact with another contact surface. Other electro-magnetic methods for detecting contact can be used. For example, contact between two contact surfaces can be detected by noting variations in capacitance, electrostatic charge, and/or inductance at the contact surface. Electro-mechanical structures can also be used to register contact between two contact surfaces, such as vibrational, sonic or ultra sonic signal generators and detectors. Electro-optical detection structures can also be used, for example, when a contact surface 72 of, for example, image sharing device 20a is brought into contact with a contact surface 72 of second image sharing device 20b, e.g., the contact surfaces can be mechanically moved, deflected and/or otherwise mechanically changed. In this example, contact circuit 74 determines these changes and causes a particular light to emit. Contact circuit 74 detects light of the type emitted in response to contact and determines that contact has been made with another image sharing device. Membership in the image sharing system 10 can be spread virally through contact in this fashion if desired. Various embodiments of communication circuits, systems and methods for using contact between communication devices to build a communication network are described in commonly assigned U.S. Pat. No. 7,027,836 entitled "Communication System and Method", filed by Zacks et al. on Oct. 10, 2002, which is incorporated herein by reference to provide non-limiting embodiments of such circuits, systems and/or methods.

It will be appreciated that the above described examples of methods for identifying image sharing devices 20a-20n for inclusion an image sharing system 10 are not limiting. As is also appreciated, that there are a wide variety of other well known methods, circuits and systems that allow manual, automatic or semi-automatic identification of image sharing devices 20a-20n that are to be included in any known communication network and that can be used for the purpose of identifying image sharing devices 20a-20n that are to be included in image sharing system 10. Communication data is stored indicating which image sharing devices 20a-20n are to be included in an image sharing system. Such communication data can be stored in any of the image sharing devices 20a-20n or in intermediary 90.

A communication link is then established between the identified image sharing devices (step 104). The communication link can be established using any known manner for forming a wired or wireless communication network that allows image sharing devices 20a-20d to exchange images.

The communication link provides the ability to transfer image content files and, optionally, other data and signals between the identified image sharing devices 20a-20n. In certain embodiments, controller 26 of each image sharing devices 20a-20n will be able to automatically determine a communication path to the other image sharing devices that are identified as being included in image sharing system 10 based upon communication information provided or obtained in the identification process. Manual intervention or involvement can be obtained in order to establish or to help establish communication links or information necessary to enable communication between any of the individual image sharing devices 20a-20n that are included in the image sharing system 10. In some embodiments, intermediary 90 can be used to enable communication between image sharing devices 20a-20n and can provide one or more common points of communication such as the Internet or other on line data routers, hosts, servers and/or networks can be used to enable such communication.

Intermediary 90 can also optionally provide transcoding or other adjustments to enable data communication between devices in image sharing system 10. Such transcoding can involve modifying image content files in any known fashion to better facilitate storage of such image content files using particular ones of the image sharing devices. Examples of such transcoding include, but are not limited, to generating image content files with modified compression, image resolution, file type, image content frame rates for video type image content files or any other aspects of an image content file. Such transcoding preferably does not negatively impact the perceived quality of the image content of the image content files. For example, it may be possible in certain circumstances to reduce the resolution or increase the compression of an image content file in a manner that reduces the amount of storage consumed by aspects of the image content that will not be readily apparent to an observer of the image content under normal viewing conditions. Similarly, adjustments in frame rates for video files may not be readily apparent. Additionally, such transcoding can adjust the nature of the image as necessary to convert image content depicted in an image content file, for example, from a conventional two-dimensional image into an image content file that can be viewed using viewing techniques including but not limited to stereo imagery, lenticular imaging techniques, or holography as can be used to create three dimensional viewing effects. However, in any circumstance in which the image content file is transcoded, such transcoding should maintain at least a minimum level of image quality.

Figure 3:
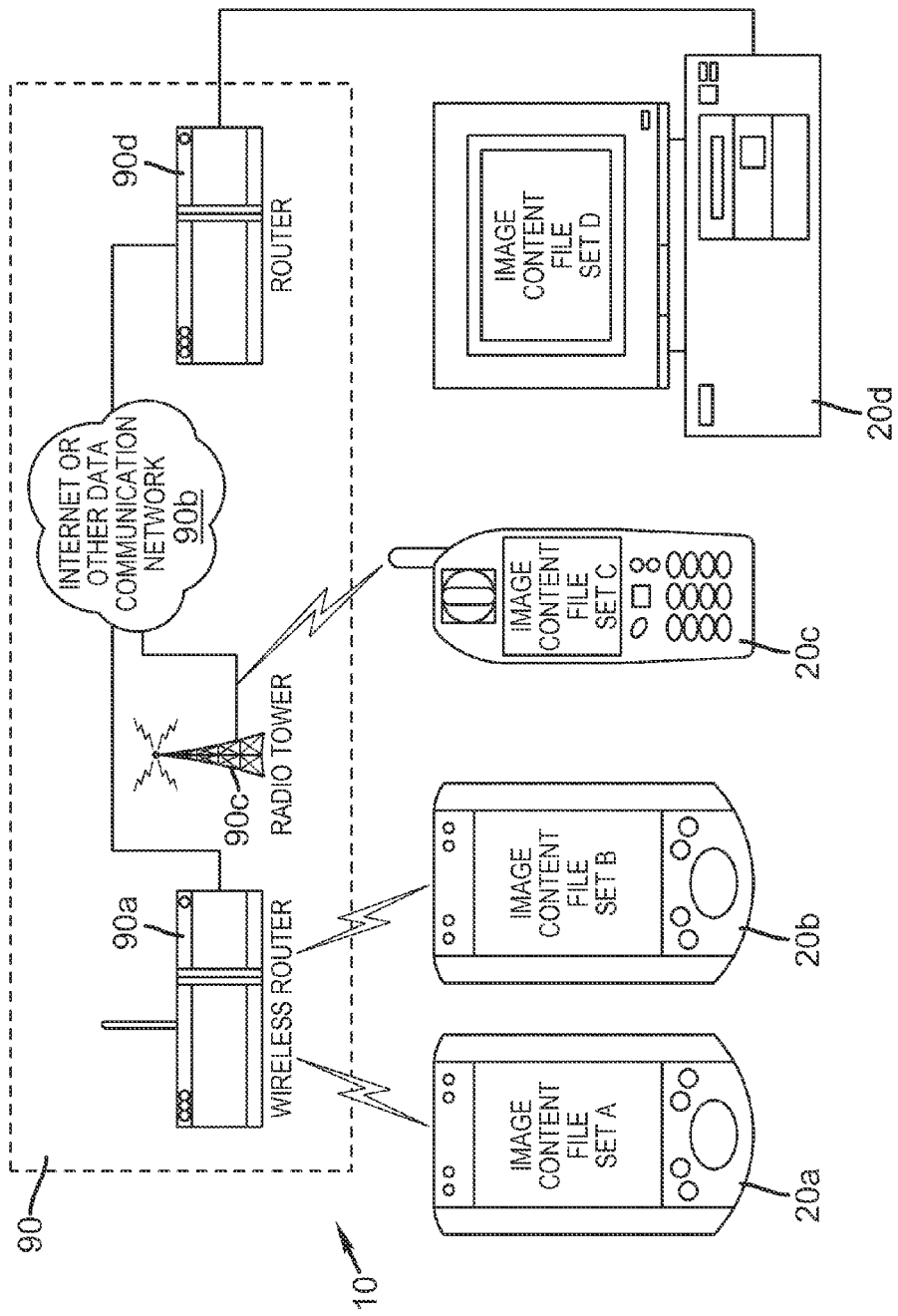
FIG. 3 illustrates a group of four users of image sharing devices participating in an image sharing system.

Communication between image sharing devices 20a-20n can be made directly or indirectly through intermediary 90 as desired. For example, as shown in FIG. 3, a group of four users of image sharing devices 20a-20d makes a decision to participate in image sharing system 10. Two members of the group have image sharing devices 20a and 20b in the form of wirelessly enabled image viewing devices. The two other members of the group have image sharing devices 20c and 20d that are incorporated respectively into a cellular telephone and a personal computer. Image sharing devices 20a-20d can communicate at least in part using different modes of communication and/or different types of communication networks and can use an intermediary 90 that includes a plurality of different component systems to enable the exchange of data. For example, image sharing devices 20a and 20b can be adapted to use WI-FI, Infrared Data Association (IrDA), with such IrDA protocols including but not limited to, the Serial Infrared Protocol (SIR) and other protocols developed by the IrDA, or Bluetooth type communication systems or other forms of data communication systems to exchange data with each other.

In the embodiment that is shown, image sharing devices 20a and 20b communicate with a wireless router 90a that is connected to the Internet 90b or other data communication network. At the same time, image sharing device 20c can use cellular telephone technology including but not limited to digital or analog cellular voice or data communications technology to exchange data with a cellular phone system 90c, which in turn communicates, in this embodiment, with the Internet or other data communication network 90b. Desktop personal computer type image sharing device 20d is shown using a wired connection to a router 90d which in turn communicates with the Internet or other data communication network 90b.

Image content files that are stored in at least one of image sharing devices 20a-20n are then identified as sharable image content files (step 106). As used herein the term sharable is used to reflect a identification of an image content file as being one that is to be made available for storage in image sharing system 10, however such identification is made. This identification can be made in any number of fashions. In one embodiment, sharable image content files are identified on the basis of a manual determination made by a user. For example, a user of image sharing devices 20a-20n can use user interface 60 to manually tag or otherwise designate image content files that are important and/or that the user wants to share within the image sharing system. For example, certain digital cameras from the Eastman Kodak Company provide a "Share" or "Favorite" button. When such buttons are pressed during review of image content from an image content file, metadata is stored indicating that the reviewed image content file has been designated as one for sharing or as a favorite. It can automatically be determined that the image content file is sharable when such designation is noted.

For example, and without limitation, a decision as to whether an individual image content file should be designated shared can also be made based upon automatic analysis of the image content files, such as by analysis of the image content or of metadata that is associated with the image content files.

Similarly, well-known automatic algorithms that assess image quality, image usage or image content can be used to provide comparative information that can be used to determine which images are to be shared can also be employed to identify sharable image content files. Examples of such automatic algorithms are described in U.S. patent application Ser. No. 11/403,686, entitled "Value Index from Incomplete Data", filed Apr. 13, 2006 in the names of Fedorovskaya et al.; and Ser. No. 11/403,352, entitled "In-Camera Dud Image Management", filed Apr. 13, 2006 in the names of Fredlund et al. Manifest data is then generated that determines which of the identified image content files are copied to which of image sharing devices 20*a*-20*n* that are in the image sharing system 10. The manifest data is determined in a manner that provides that each shareable image content file is stored in at least two of image sharing devices 20*a*-20*n* of image sharing system 10 (step 108). The manifest data can also optionally provide data from which a schedule or prioritization for the copying process can be determined. There are a wide variety of ways in which determinations of about the distribution of the copies of image content files are to be made and the timing of such distributions.

In certain embodiments, aspects of the implementing technology supporting the image sharing system 10 and or the individual image sharing devices 20*a*-20*d* involved in image sharing system 10 can be used to make distribution and timing determinations that support generation of the manifest data. The manifest data can be determined, for example, based upon the technical capabilities of an image sharing device or technical capabilities of a communication link between the image sharing devices and the attributes of the shareable image data files in a manner that causes the manifest data to directs the sharable image files to a combination of the image sharing devices that provides a relatively high level of system performance in accordance with the capacity of the image sharing devices to share and store the sharable image content files and/or in accordance with the ability of the communication link to share such files. It will be appreciated that in some embodiments of image sharing system 10, hand held and portable forms of image sharing devices 20*a*-20*n* typically have lower memory, processing, and/or data transfer rates than fixed location devices. Accordingly, where such differences exist, copies of larger image content files such as those that contain for example and without restriction full resolution images, RAW format image files, video files, image streams, image sequences can be preferentially directed for distribution to fixed position type image sharing devices, while smaller sized image content files, image content files that have lower image values, or image content files that are otherwise determined to be of low priority can be copied to the portable type image sharing devices.

In another alternative embodiment of this type, a smaller number of larger image content files can be scored in such portable type image sharing devices. Optionally, the selection of and storage of such larger sized image content files in such portable image sharing devices can be made according to a prioritization scheme.

Similarly, it will be appreciated that differences in the characteristics of the communication links provided in a particular image sharing system 10 can be used as a factor in determining the distribution and timing of copies of image content files used to generate the manifest data. For example, where a fixed position type of image sharing devices 20*a*-20*n* is connected to other devices using a slow data rate communication link or a data communication link that is shared between many users then this factor may mitigate against the use of the fixed position type of image sharing device to store comparatively large data files, or perhaps, such large data files will be stored in such a device but the timing of such storage will be arranged such that storage occurs at times when the data rate may be effectively increased because the fewer shared users are requiring access to the bandwidth that is available on line.

Personal preferences can also constitute a factor in the distribution or timing determined during the generation of manifest data. For example, a user of one of image sharing devices 20*a* can determine that specific ones of the sharable image content files should not be copied on to other ones of image sharing devices 20*a*-20*n*, such as onto a sibling or child's image sharing device in a manner that allows the image content of such image content files to be viewed by the recipient. In such cases, such image content files can be stored in other ones of the image sharing device or can be stored in a password protected or in an encrypted or other form of inaccessible format. Such preferences can be individual or group based. Further, a user can indicate a preference that no image content files be stored on certain image sharing devices in the image sharing system 10. For example, a user may wish to prohibit storing image content files on a digital camera. These personal or group preferences can be expressed using image sharing devices 20*a*-20*n* or an intermediary 90 or any other device that can communicate therewith and that can express such a preference. Default settings such as instructions to share only favorites or to share all image content data files can be provided.

Another way to determine which of image sharing devices 20*a*-20*n*, is a copy of a sharable image content file will be distributed is to analyze the content of the image content file. In one embodiment of this type, such analysis is done in order to identify people, places or things in the image content and, preferentially, store image content that such people, places or things with particular image sharing devices that can be determined to have some relationship with such people, places or things. In one non-limiting embodiment of this type, image content files that have image content that includes a participant and/or his or her family in them can be shared only among image sharing devices owned or operated by family members. This helps to ensure image content data files are stored on image sharing devices in which there will be some degree of interest in preserving and protecting the image content files and a greater willingness to allow a portion of the memory capacity of their image sharing devices to be used for storing such image content files. For example, image content files captured by one image sharing device can depict children from a family that owns a different one of the image sharing devices in the network. When such children are identified in the image content of image content files of that image sharing device, a copy of the image content file can be sent to the image sharing device owned by that family. In another example, an image content file captured on a first one of image sharing devices 20*a*-20*n* includes image content depicting an owner of another one of image sharing devices 20*a*-20*n* then that image can directed for storage in the image sharing device owned by that person. It will be appreciated that a wide variety of strategies can be developed.

Still another factor that can be used in determining manifest data is the typical geographic distribution of image sharing devices 20*a*-20*n*. In particular, it will be understood that unfortunate events that might impose the operation of one of the image sharing devices 20*a*-20*n*, typically only impact regional or local areas, thus by insuing broad geographic distribution of image content files can serve to increase the probability that at least one copy of an image content file will survive such an event.

Any or all image content files can be encrypted. This can be a global encryption for all image content files stored, unique for a group of image of image content files or may be unique for each image content file. Then when sharing is desired, a decryption key can be sent. The high resolution image already resides with image sharing devices $20a$-$20n$ receiving the high resolution image, so sharing is expedited. If the image is encrypted, the image need only be decrypted for viewing, which typically takes much less time than transmitting a large file. Additionally, if the image content files are encrypted or not, an image sharing device $20a$-$20n$ can send a viewing file to another image sharing device which calls out specific portions of images, zooms and pans, order of presentation, or storylines with audio or text supplied. For viewing, the image sharing device need only access the desired images for display. Particularly if encrypted image content files are only a small percentage of the total number shared and stored, on a particular one of the image sharing devices $20a$-$20n$ the encrypted image content files may be hidden from the receiving image sharing device so that it is difficult to determine if encrypted images are present.

The manifest data can optionally be prioritized. In particular, image sharing system 10 can determine the manifest data to reflect an ordering scheme for copying image content files. In this way, the manifest data can direct or suggest that certain image content files be copied first with others copied later. Any prioritization of the manifest data can be based upon any rational criterion. For example, and without limitation, greater priority can be assigned to particular image content files based upon personal preferences, image value, image quality, metadata that is associated with the image content file, or characteristics of the image content files.

Index data can then be created indicating the at least two image sharing devices $20a$-$20n$ in which each sharable image content file is stored. In one embodiment, this can involve determining which sharable image content files were identified on which of image sharing devices $20a$-$20n$ (step 110) and then supplementing this information with data identifying which other image sharing devices have been used to store a copy of the content data file (step 114). The index data can take any of a variety of forms. In one embodiment, index data can be stored in the form of an index data file that can be shared with each of image sharing devices $20a$-$20n$ in the image sharing system 10. This can be done by storing copies of the index data file with each of image sharing devices $20a$-$20n$ in image sharing system 10, or by storing the index data file with an intermediary 90 or with selected ones of image sharing devices $20a$-$20n$ in a manner that allows the stored index data file. Alternatively, this can be done by storing index data in each of the image content files stored in image sharing system 10, this can be done for example, and without limitation using metadata associated with image content files using digital watermarking techniques or by using digital data stored, for example, in a header portion of a content data file providing data files that are separate from the image content files, but associated therewith in some logical manner.

The sharable image content files are then automatically copied according to the manifest data so that each shareable image content file is stored in at least two of image sharing devices $20a$-$20n$ of image sharing system 10 (step 112). Typically, each shareable image content file is stored both on the image sharing device in which it is originally found and one other of image sharing devices $20a$-$20n$. However, other storage arrangements can be used. This creates an increased probability that such sharable image content files will be preserved from destruction in the event that image sharing devices $20a$-$20n$ upon which the sharable image content file was found is disabled, damaged, replaced or otherwise unavailable.

Figure 4:
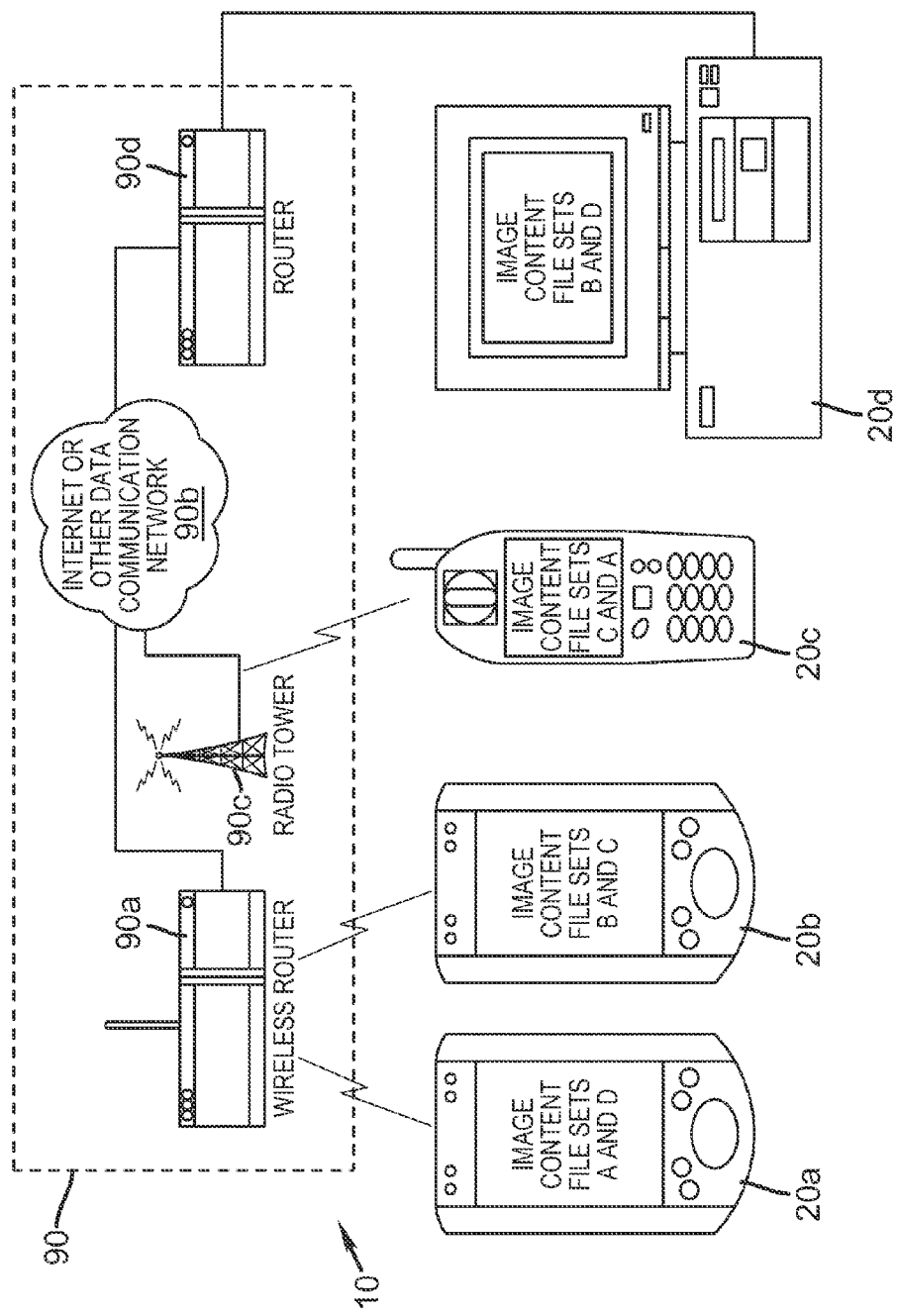
FIG. 4 illustrates a group of four users of image sharing devices participating in an image sharing system having shared information

For example as shown in FIG. 3, before such sharing occurs each of image sharing devices $20a$-$20d$ has stored therein one sharable image file, these sharable image files are shown as sharable image content files A, B, C and D respectively. As is shown in FIG. 4, after such copying occurs, each of image sharing devices $20a$-$20d$ has its original shareable image data files A, B, C, and D respectively, plus an additional copy of one of sharable image files A, B, C, and D from one of the other image sharing devices $20a$-$20n$.

It will be appreciated that by storing sharable image content files on more than two of image sharing devices $20a$-$20n$ it is greatly more probable that one of a copy or the original of such a sharable image content file will be available after a catastrophic or other event in which, for example, one of image sharing devices $20a$-$20n$ in which the content data file is stored, is damaged or otherwise compromised. It will also be appreciated that it can be useful to store such image files in more than two of image sharing devices $20a$-$20n$, however, the data storage requirements of the overall system increase significantly when this is done. In particular, the present invention teaches against storage of all of the image content files in each of image sharing devices $20a$-$20n$ in image sharing system 10.

Accordingly, in yet another alternative embodiment, the manifest data can be generated so that only those image content files that have high image values, image content files that have been identified for high priority copying, or image content files that otherwise meet any logical criteria for enhanced redundancy can be copied such that after copying such image content files can be found on more than two of the image sharing devices.

During or after copying the image content file, supplemental data can optionally be stored with the index data associated with the image content file (step 114). The supplemental data can include other information regarding sharable image content files, including but not limited to, information from which it later can be determined whether an image content file has been changed after it has originally been copied. There are a number of ways in which this can be done and any can be used. Specific non-limiting examples of particular ways in which this might be performed are as follows. For example, time and date information can be stored indicating when the version of a shared image content file was last created or modified so that at a later time, the time and date of last storage or modification of a copy can be compared to the stored time and date to help to ensure that the image is in its original form. Alternatively, other data can be stored in the image content files such as for example, watermark or other data the presence of which will be altered or impaired by a modification of the image content of the image content file.

In still other embodiments, supplemental data can be extracted or derived from the image content file that is representative of the image content in some prescribed manner that can be repeatably performed. The extracted or derived data is then stored and the extracted or derived supplemental data can be re-extracted from the image content in the prescribed manner and compared to the previously extracted data.

One example of a way in which this can be done is described in commonly assigned U.S. patent application Ser. No. 09/966,678, entitled "System and Method of Authenticating a Digitally Captured Image", filed on Sep. 28, 2001 in the names of Fredlund et al., in which there is provided a method of processing for later authentication a digital still image captured using a digital image capture device. In one embodiment thereof, a method is provided that comprises the steps of transmitting signature data from a remote location to the digital image capture device; associating an image identification with the digital still image; applying the signature data to the captured digital still image to produce an authentication signature representative of the captured digital still image; associating the authentication signature with the image identification; transmitting the authentication signature to the remote location; and storing the signature data, authentication signature, and image identification at the remote location. To process the image for later authentication, signature data is transmitted from a remote location to the digital image capture device. Upon capturing the digital still image, an image identification is associated with the digital still image. The signature data is then applied to the captured digital still image to produce an authentication signature representative of the captured digital still image. The authentication signature is associated with the image identification and transmitted from the digital still image to the remote location for storage at the remote location. To later authenticate the digital still image, the digital still image is transmitted to the remote location. The signature data for the transmitted digital still image is accessed and applied to the transmitted digital still image to produce a verification signature. The authentication signature and the verification signature are compared to determine the authentication of the transmitted digital still image. While this process is described in a manner that relates generally to signature steps that are performed at or about the time of capture, such steps can also be performed at a time of image sharing or access.

After an optional delay period or after the occurrence of an event suggesting that it is appropriate to verify that the image content files are situated as suggested by the index data (step 116), the sharable image content files stored in each of image sharing devices 20a-20n in the image sharing system are monitored to determine whether any of the identified shareable image content files is missing from or changed on any of the at least two image sharing devices on which it is stored (step 118). The monitoring can be performed by any of the controllers 26 of any of image sharing devices 20a-20n. As will be discussed in greater detail below, the monitoring can be performed by intermediary 90. If it is determined that no image shareable image content files have been modified or deleted, then the process returns to step 106 to allow the identification of any new sharable image content files.

If, however, any identified sharable image content file is missing from or found to be in a changed form on a first image sharing device of the at least two image sharing devices onto which it has been copied then the controller 26 or intermediary 90 can automatically copy an original copy of that image content file to the first image sharing device (step 122). The process then returns to step 106 where sharable image content files stored on image sharing devices 20a-20n are identified and the process repeats.

As is also shown in FIG. 2, an optional step (step 120) of determining whether a removal or change to an image content file is made with approval is performed in addition to the steps described above with respect to FIG. 2. In this additional step it is determined whether a change or removal of image content file was done with approval. This approval can be automatic or manual. For example, a controller 26 or intermediary 90 can be programmed to automatically remove image content files that have been unopened for a period of time, or that have been manually removed by a member of the image sharing system 10. In one non-limiting example, each sharable image content file is associated with an "owner" either a person who uses an image sharing device or an image sharing device that is assigned to a user of "owner". An "owner" of an image content file can be logically associated with the image content file in any known fashion so long as image sharing system 10 can determine who or what image sharing device or what process running on an image sharing device is the owner of the image content file. In one embodiment, the supplemental data stored with index data 94 can include owner identification data that is associates an owner with each of the indexed image content files. Alternatively, owner identification data can be stored with manifest data, as metadata with image content files themselves, or in any other location that is accessible to image sharing system 10. Such owner identification data can also include data that indicates whether particular classes of image content files are to be shared with others outside of image sharing system 10 and under what conditions.

Decisions made by the owner or by a person using the owner device can be decisive as to whether a deletion or change to a sharable image is to be allowed. If a user of image sharing system 10 who is not the "owner" attempts to delete or change a sharable image content file, then such an attempt can be ignored unless the requested action is either approved by or made by the owner of the image content file. Alternatively, the attempt can be allowed with the possibility of later undoing the deletion or change if approval is not obtained. This step can include providing a warning to an owner of the image content file or to one or more of image sharing devices 20a-20n such as "Danger-your images are not resident at Image Sharing Device #1." An owner or user of an image sharing device 20a-20n can ignore such a warning, indicate that such changes are approved or that such conditions are not approved.

Alternatively, where the decision is not approved other actions can be taken such as the creation of a new image content file and owner identification data based upon the image content that has been modified by a non-owner user of an image content file. Where a deletion of an image content file is approved by an owner, image content file is deleted from all image sharing devices and the manifest data can be changed to reflect the deletion of the image content file. Because it may take a period of time to delete such a file from all such image sharing devices, icons or other symbols representing the image content file in any indexing, windowing or other file lists can be visually modified to suggest that the particular image content file has been or will be deleted. In one embodiment of this type, activation of the visually modified identifier can be interpreted as a decision to rescind the act of authorizing deletion of the image content file and any remaining copies of image content files can be used to replace any copies of the image content files that were deleted before the decision to rescind deleting the image content file was made. The index data can be modified to remove any reference to a deleted image content file or to maintain a record indicating that the particular image content file was deleted.

Figure 5:
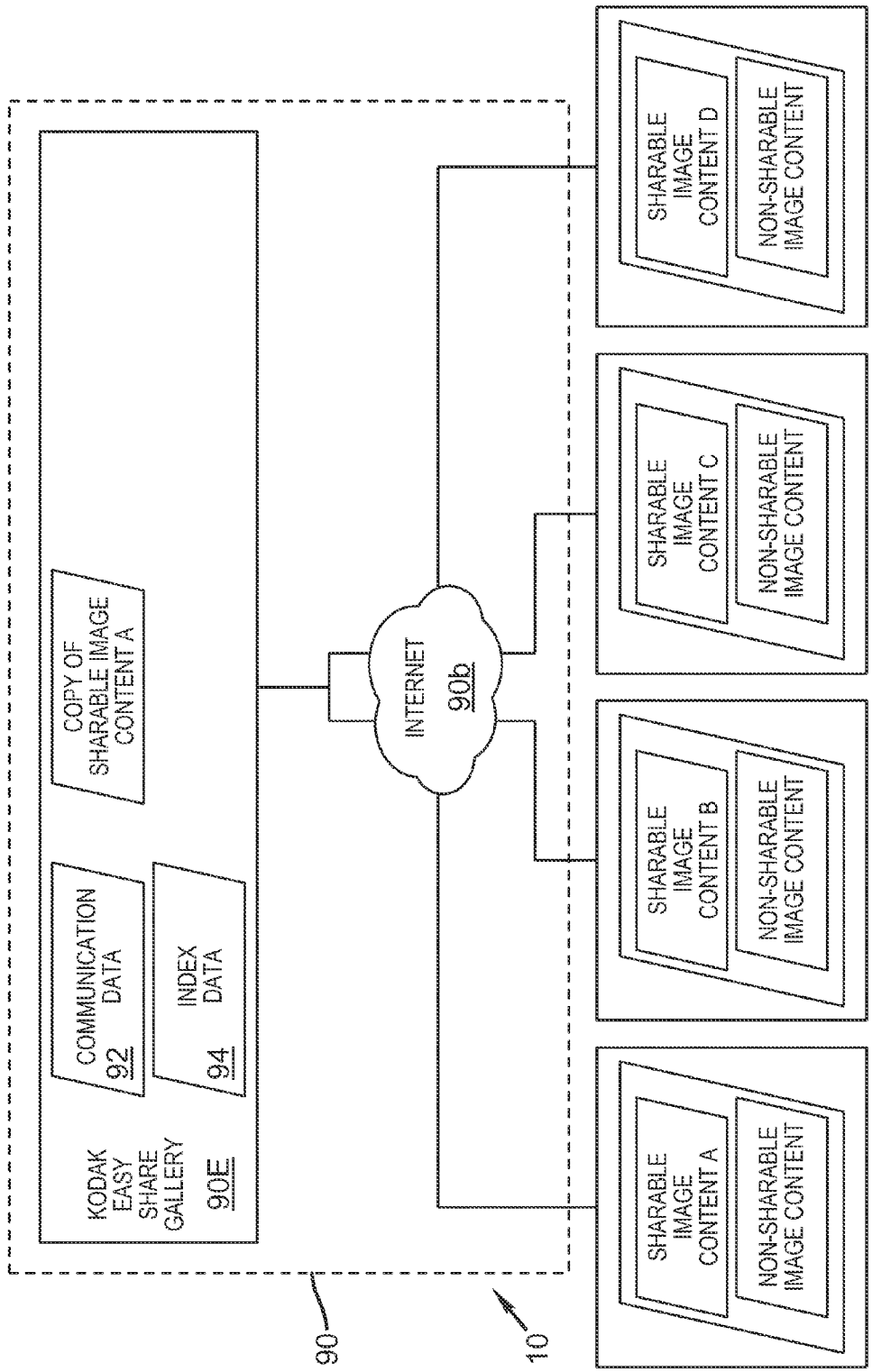
FIG. 5 illustrates another example embodiment of the image sharing system having an intermediary.

FIG. 5 illustrates another example embodiment of an image sharing system 10 having an intermediary 90. In this embodiment, intermediary 90 comprises a website, such as the Kodak EasyShare Gallery 90e, which acts as a hub, keeps records of the communication data 92, and index data 94 including supplemental data, and directs connectivity across network 90b which is usually the Internet but as is noted above can comprise any known form of data network. In this embodiment, a user provides Kodak EasyShare Gallery 90e with the email addresses of each of image sharing devices 20a-20n that the user wishes to include in image sharing system 10. In a known manner, the intermediary sends invitations to each of the designated e-mail recipients. This information is stored in this embodiment as "communication data" 92 at the Kodak EasyShare Gallery 90e. If the prospective participant accepts the invitation, any software necessary for maintaining the image sharing system 10 can be downloaded. The acceptance can be on a full or limited trial basis so that the prospective member of image sharing system 10 can decide whether or not to commit to participation in image sharing system 10 after trying it. The limited trial can be for a specified time or a specified number of images. Any invitee who chooses not to participate is removed, and has his or her email address or other identification information removed from the communication data 92.

The user initiating the image sharing system in this manner can also provide an image sharing device 20a-20n for prospective image sharing members. This is in the best interests of both because it entices other image sharing system members to more readily agree to participate. The members of the image sharing system 10 can provide reciprocal sharing. Under most conditions, any user within image sharing system 10 can identify image content files for sharing. However, there may be times when one way only sharing is advantageous.

As part of the identification process (step 102), the amount of storage space that is available for saving image content files between image sharing devices 20a-20n in image sharing system 10 can be specified. Participants can optionally indicate limits on the amount of space that will be allotted to image content files supplied by any given member or by the overall system 10. This serves to minimize the amount of resources that a particular user must devote when agreeing to participate in image sharing system 10. The amount of resources may be determined as an absolute number of files, absolute number of bytes, a percentage of total storage, a percentage of available storage, a distribution of file types or other measures.

Alternatively, the amount of resources committed to image sharing can be defined in reciprocal terms with participants in an image sharing system agreeing to share memory or other resource capacity with other image sharing devices to the same extent that others are willing to share image sharing resource capacity with them. For example, a participant in an image sharing system 10 can agree to share a comparable number of image content files, memory capacity, percentage of memory capacity, resource capacity or percentage of resource capacity. Notifications can be given when allotted storage space nears limits, and corrective action can be initiated. Sharing and backup and distribution rights can be suspended as a result of reaching limitations.

Figure 6:
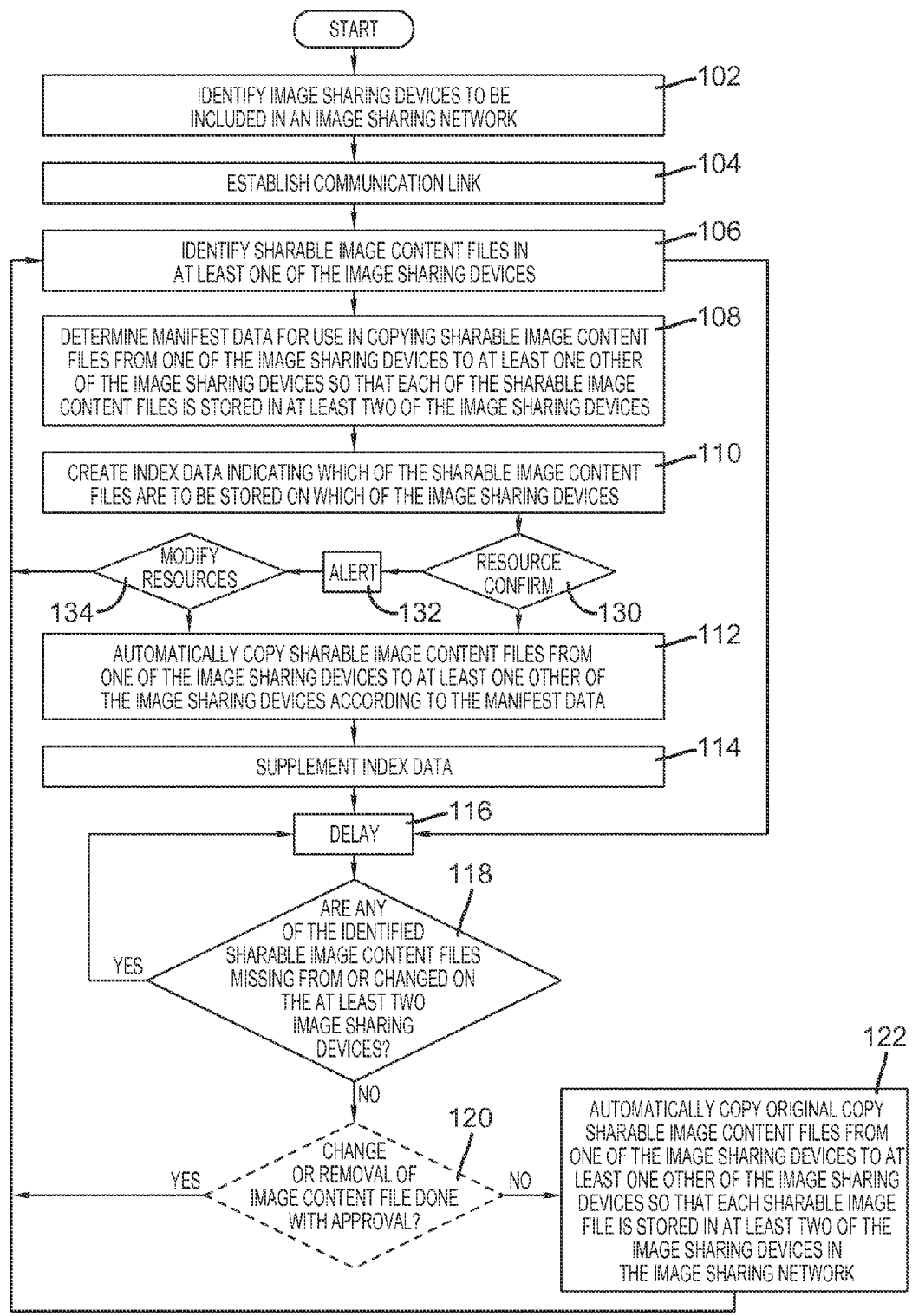
FIG. 6 shows a block diagram of another embodiment of a method for establishing an image sharing system using the image sharing system of FIG. 5 or any other image sharing system.

FIG. 6 illustrates one embodiment of image sharing system 10 that is adapted to anticipate and/or identify data storage capacity issues by performing a resource confirmation process (steps 130-134). In this example embodiment, the available memory 36 in each of image sharing devices 20a-20n of image sharing system 10 is assumed to have a finite capacity. Further, as noted above individual users of such image sharing devices 20a-20n can have the capacity to limit the amount of memory 36 in each image sharing device 20a-20n that is committed to shared resources. Accordingly, it may occur that there is simply insufficient data storage to store all of the sharable image content files using only those resources that are initially committed by the initially identified members of the image sharing system 10.

In a first step of this process, system resource testing can be performed (step 130). Where the system resource testing (step 130) indicates that memory capacity or other resources necessary to execute the storage function are insufficient for the demands, an alert can be sent to one or more of the members of the image sharing system 10 (step 132) A user can respond to this alert by agreeing to adjust available resources or by reducing the users demands upon the system.

Where a user refuses, the step of identifying sharable image content files can be adjusted to conform to available resources. This process can be done, for example, and without limitation as a part of the storage steps 112 or 120, or as a part of determining index data, manifest data or feedback data.

In this embodiment, the manner in which the image content files or other data is exchanged or copied is transparent to the user. System 10 copies image content files as necessary background, only alerting the user when necessary.

In this embodiment, image sharing device 20a comprises a home system image sharing system taking the form of a personal computer onto which image content files can be loaded from sources including, but not limited to, a digital camera, cellular phone, scanner, disk or graphics package, video editor, or animator. When it is determined that image sharing device 20a has a new image content file A, it automatically identifies such it as one of a non-sharable image content file or a sharable image content file. Here image content file A is determined to be shareable and it is uploaded to the Kodak EasyShare Gallery 90e (step 106). In this embodiment, an analysis of the inventory of image content files stored in image sharing device 20a can take place at image sharing device 20a so that only the identified image content files are uploaded to the Kodak EasyShare Gallery 90e. Alternatively, an intermediary 90 such as Kodak EasyShare Gallery 90e can perform this function. The identified image content files can be reduced and compressed for better use of bandwidth or memory capacity as desired.

As is illustrated in FIG. 6, this process is repeated for each of the remaining image sharing devices 20b-20d in image sharing system 10 so that all of identified image content files B, C, and D for each of image sharing devices 20b-20d are uploaded. Index data is then generated indicating which of the sharing image content files were found on which of the image sharing devices (step 108).

Figure 7:
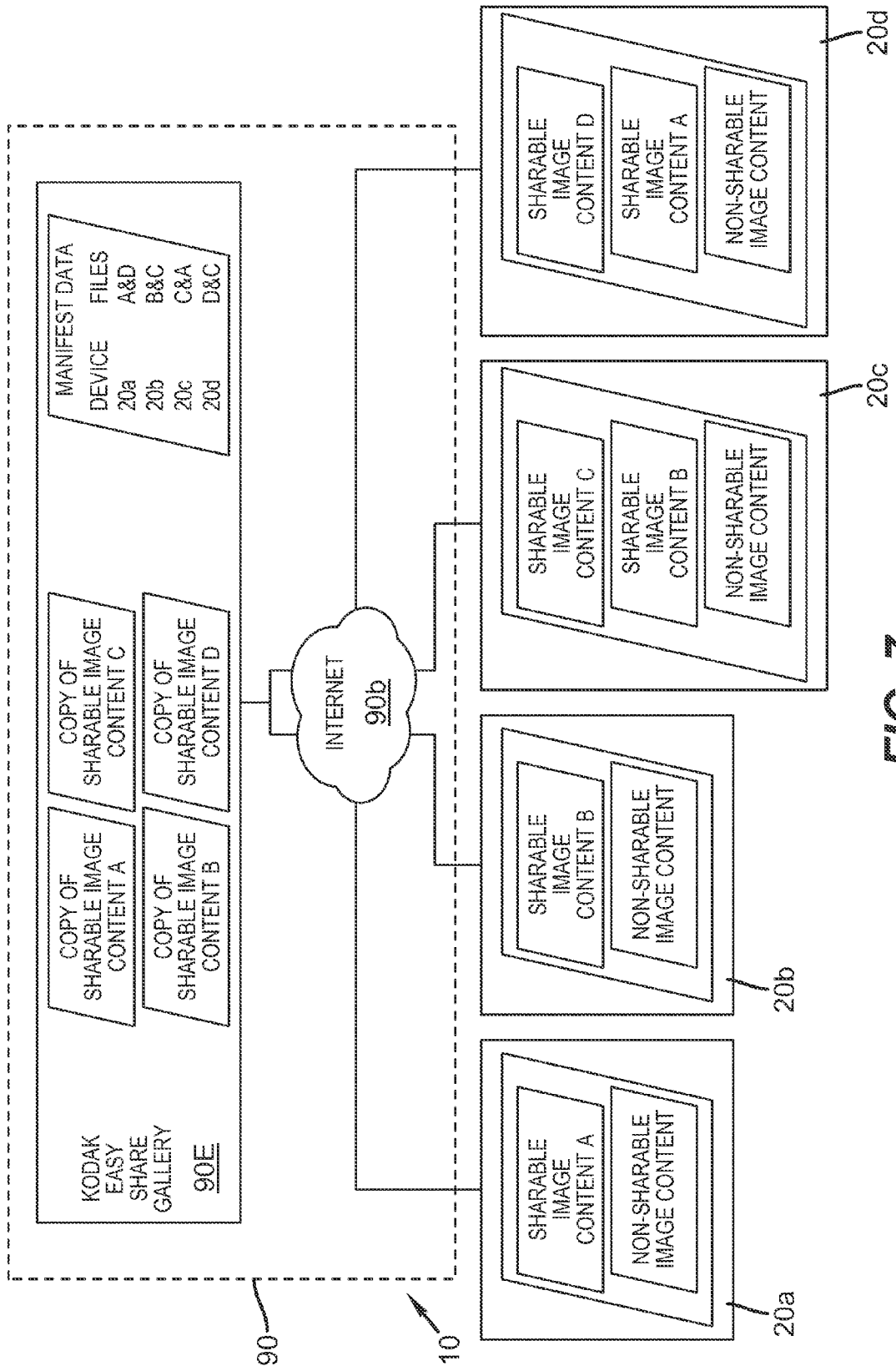
FIG. 7 illustrates the embodiment of FIG. 5 with copies of sharable image content files stored temporarily in the intermediary and with manifest data.
Figure 8:
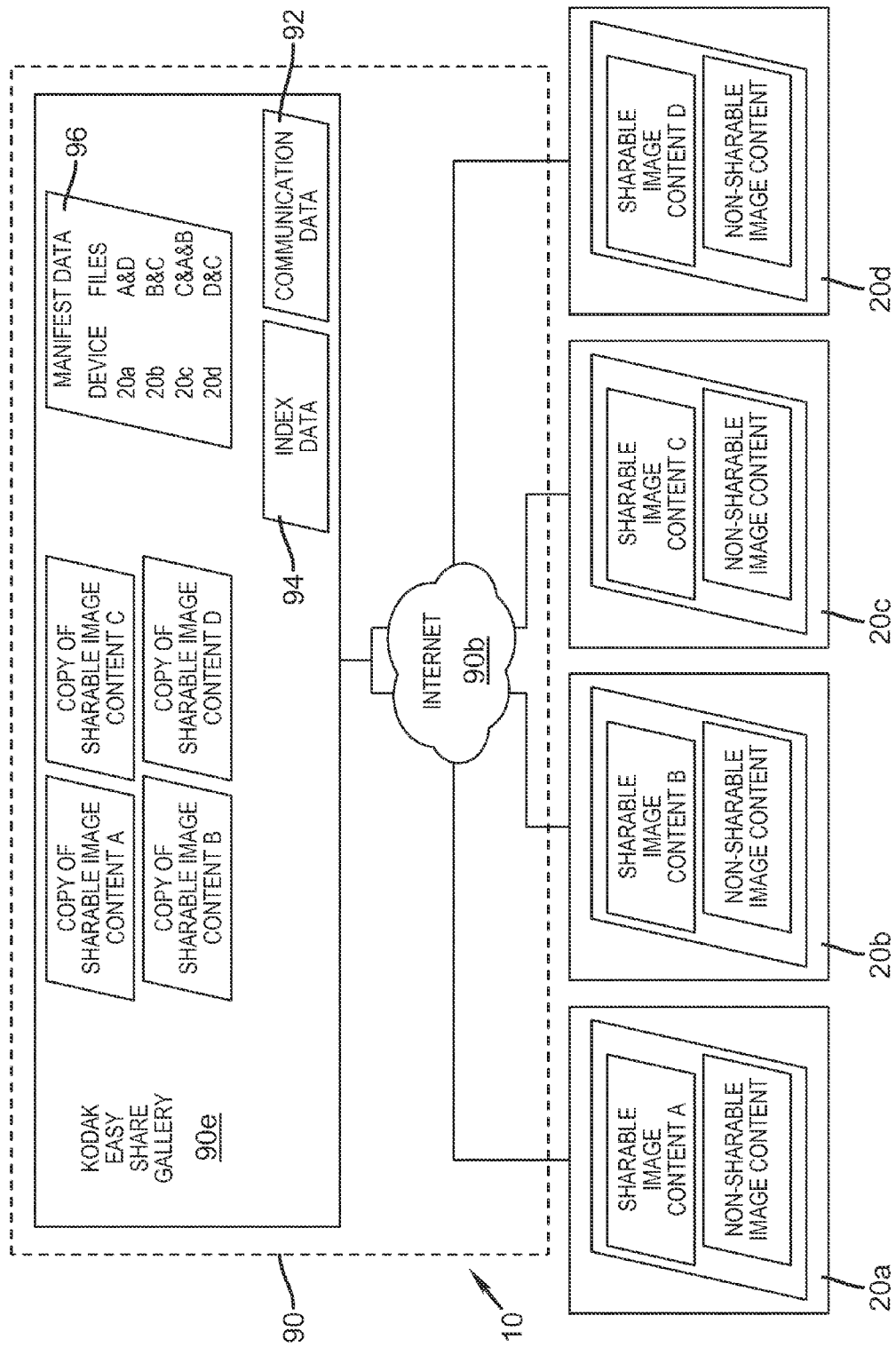
FIG. 8 illustrates the embodiment of FIG. 5 with copies of sharable image content files stored temporarily in the intermediary and with manifest data.

As is illustrated in FIG. 7, manifest data 96 is then generated (step 110) that correlates each of image sharing devices 20a-20d in image sharing system 10 with the sharable image content files A-D originally associated therewith and with one set of sharable image content file sets A-D originally associated with one of the other ones of image sharing devices 20a-20d so that each set of image data files is stored in at least one other image sharing device.

As is also illustrated in FIG. 7, the manifest data directs the identified sharable image content files to image sharing devices 20a-20d so that each of image content files A-D will be stored in more than one image sharing device (step 112). However, as is illustrated in this embodiment, image sharing device 20b receives no copies of sharable image content files. This can be for reasons of device or channel limitations or according to the preferences of the users of image sharing system 10. Instead, image sharing device 20c receives copies of image content files from sets A and B and therefore stores sharable image content files from sets of image content files A, B and C. The index data is supplemented indicating the at least two image sharing devices used to store each sharable index file (step 114). It will be appreciated that any of files A-D can be received in an encrypted form and that it is not required that such files be provided with a decryption key at the time of sharing. Instead, as noted elsewhere herein such a decryption key can be obtained upon request from a member of the image sharing system who is authorized to view the image content. However, this is not mandatory and in certain embodiments a decryption key can be provided with the image content files.

Figure 9:
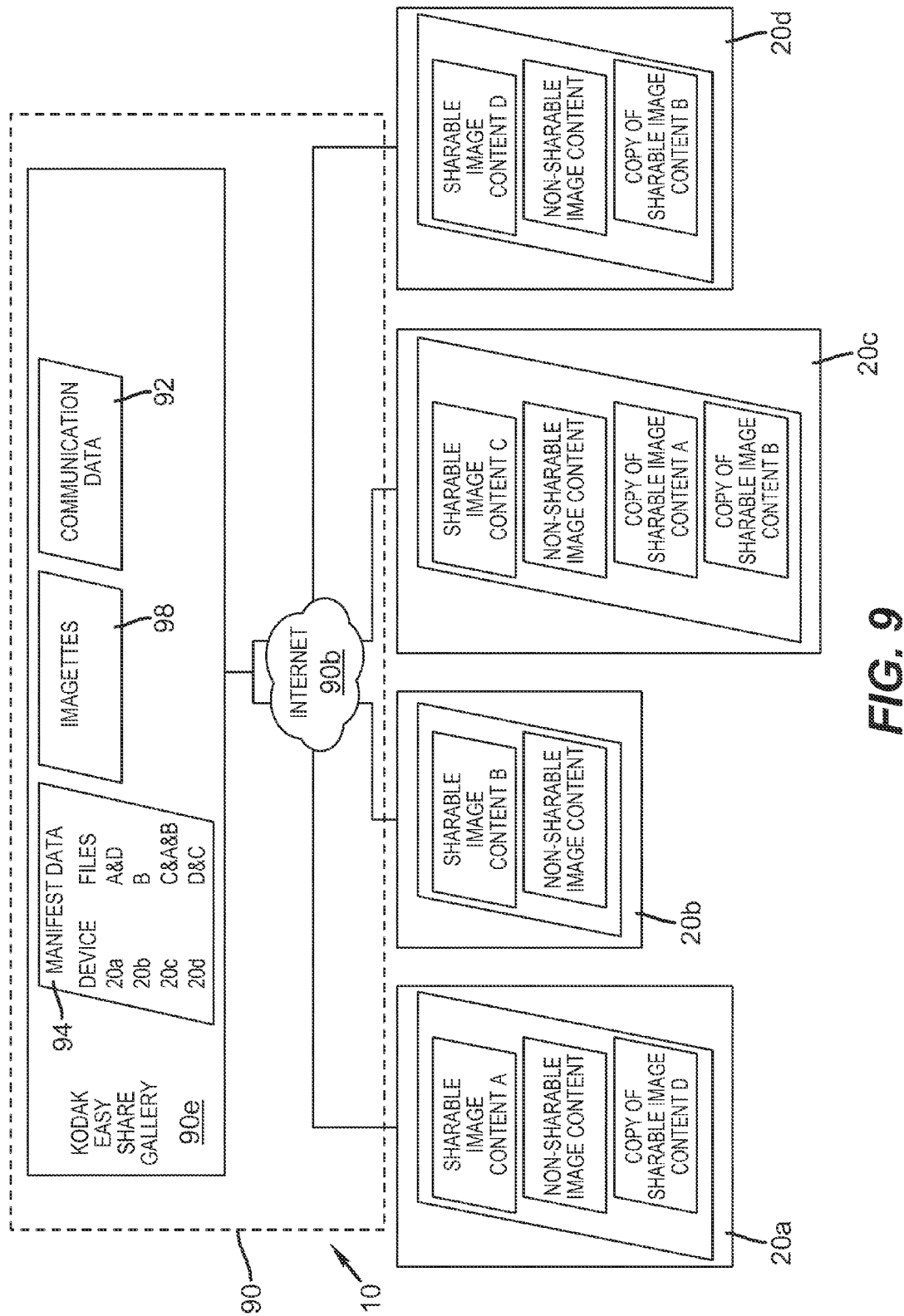
FIG. 9 illustrates the embodiment of FIG. 5 with copies of sharable image content files removed from the intermediary and with manifest data an imagettes stored therein.

In the illustrated embodiment, the image content files are uploaded in full resolution. This requires that large image files be uploaded and stored in the Kodak EasyShare Gallery 90e. However, as is illustrated in FIG. 9, in the embodiment of FIGS. 5-9 such sharable image content files A, B, C, and D are only stored as long as is necessary to distribute them according to the manifest data. Optionally, representative imagettes 98 can be derived from the sharable image content data files A, B, C and D and maintained at the Kodak EasyShare Gallery 90e for future reference. Such imagettes 98 will provide an indication of the image content of the image content data files in a form that does not require as much data storage capacity as the original image content files from which they are derived.

In this embodiment, the Kodak EasyShare Gallery 90e periodically checks the image content data files stored in each to see that all of the sharable image content files are located where index data 94 suggests that such sharable image content files A, B, C and D should be located and to ensure that all of the sharable image content files A, B, C and D are not damaged or modified. It will be appreciated that as a part of this process it is necessary for the Kodak EasyShare Gallery 90e to communicate with each of image sharing devices 20a-20d. Under a wide variety of circumstances, it may not be possible to communicate with each of image sharing devices 20a-20n included in image sharing system 10 at the same time. For example, a cellular phone embodiment of image sharing device 20a can be turned off of otherwise rendered incommunicado.

Figure 10:
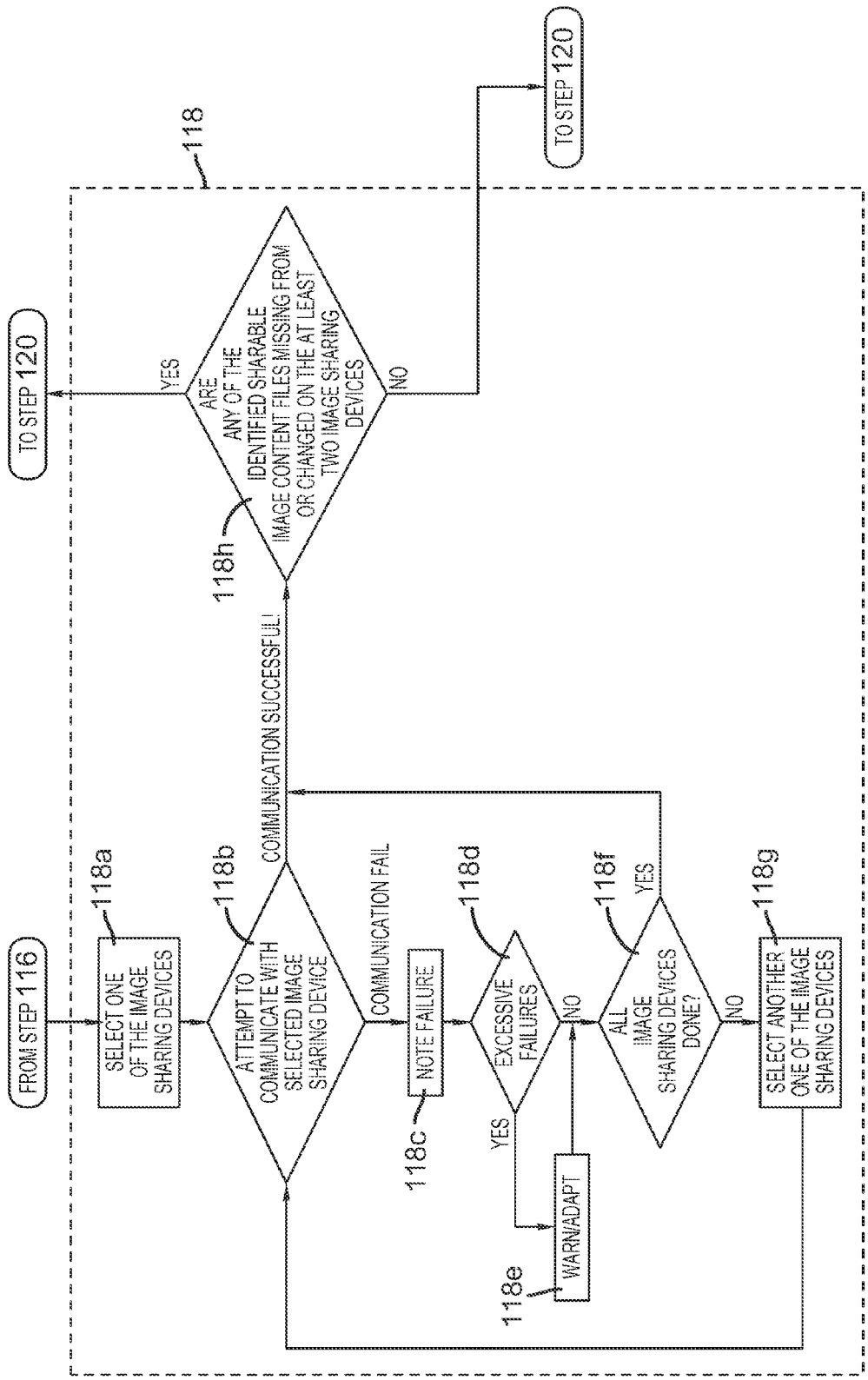
FIG. 10 shows one embodiment of method steps for reviewing image content files that have been stored on an image sharing device.

Accordingly, as shown in FIG. 10 step 118 can include substeps that identify when an image sharing device has not been in communication for a period of time. For example, step 118 can include the substeps of selecting one of image sharing devices 20a-20n included in image sharing system 10 (substep 118a). This selection can be done in a planned or essentially unplanned manner. An attempt is then made to communicate with the selected one of image sharing devices 20a-20n (substep 118b) and if the communication is successful, the process proceeds in step 118h in the manner that is discussed above with respect to general step 118. If the communication is unsuccessful, the failure is noted (substep 118c) and it is determined whether there have been an excessive number of failures in establishing communication with the selected one of image sharing devices 20a-20n in image sharing system 10 (substep 118d) where there has been no excessive number of failures to communicate, the method proceeds to the step of determining whether all image sharing devices in image sharing system 10 have been communicated with (substep 118f) and, if so, the process returns to step 118h. If all image sharing devices 20a-20n in image sharing system 10 have not been communicated with, then another one of image sharing devices 20a-20n is selected and substeps 118b-118f repeat.

If however, it is determined that an excessive number of failures has occurred, then a warning or adaptation process can be executed (substep 118e). In one example of this step one or more of image sharing devices 20a-20n used in image sharing system 10 is caused to provide a visual or audio warning indicating that there has been difficulty in communicating with the image sharing device that has the excessive number of communication failures. A user can take appropriate action based upon this information such as determining the cause of the failure to communicate and correcting it or such other action as the user deems to be appropriate. In the case of a disaster, system 10 can prompt the user of image sharing devices 20a-20n that has suffered from the disaster to copy images from another source. Alternatively, this can happen automatically once system 10 has detected the disaster. Image sharing system 10 can also notify the user that there has been a disaster, since it may not be obvious. Additionally, image sharing system 10 can monitor and make notification if there is sporadic failure indicating an impending larger problem.

Alternatively, in another embodiment, image sharing system 10 can adapt (step 118e) by modifying the manifest data so that the image sharing device with which system 10 cannot communicate is not relied upon to store image content files. This can be done by readjusting the allocation of identified image content files so that identified image content files are shared with at least two of the remaining image sharing devices 20a-20n in image sharing system 10.

There are various possible versions for the architecture of image sharing system 10. The first has been generally discussed with reference to FIGS. 5-9 and a second is a system where an intermediary 90, such as the Kodak EasyShare Gallery is pivotal for exchange of image content files. In such an embodiment, image content files are uploaded to the intermediary 90 for storage and then downloaded to image sharing devices 20a-20n. When all of the image content files are successfully downloaded to all the designated image sharing devices 20a-20n, they are removed from the Gallery. Records are kept at the Gallery concerning the downloaded images for the purpose of monitoring image health at each of the image sharing devices 20a-20n. Images are uploaded and downloaded asynchronously.

Figure 11:
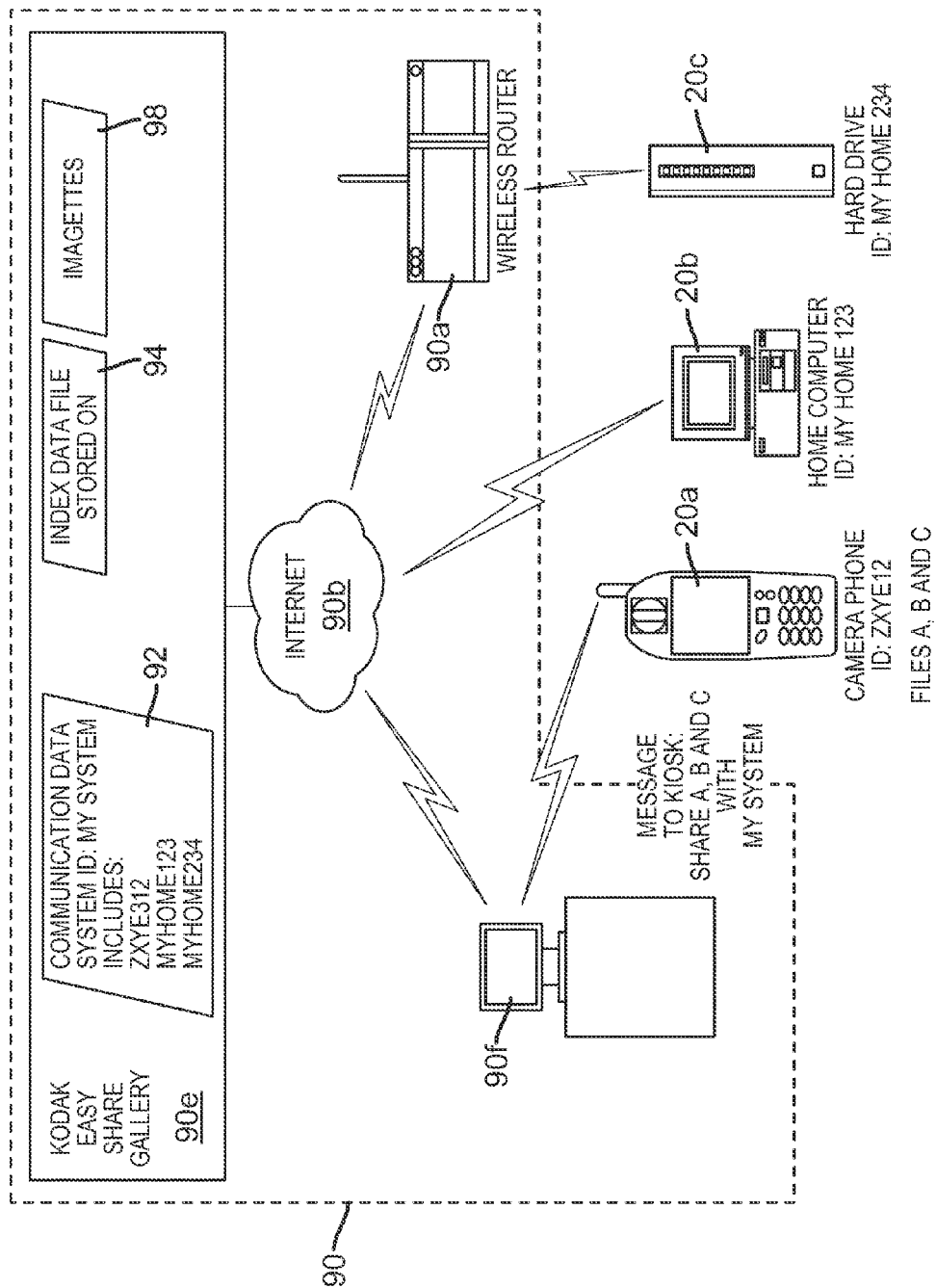
FIG. 11 shows image sharing using another embodiment of the image sharing system.
Figure 12:
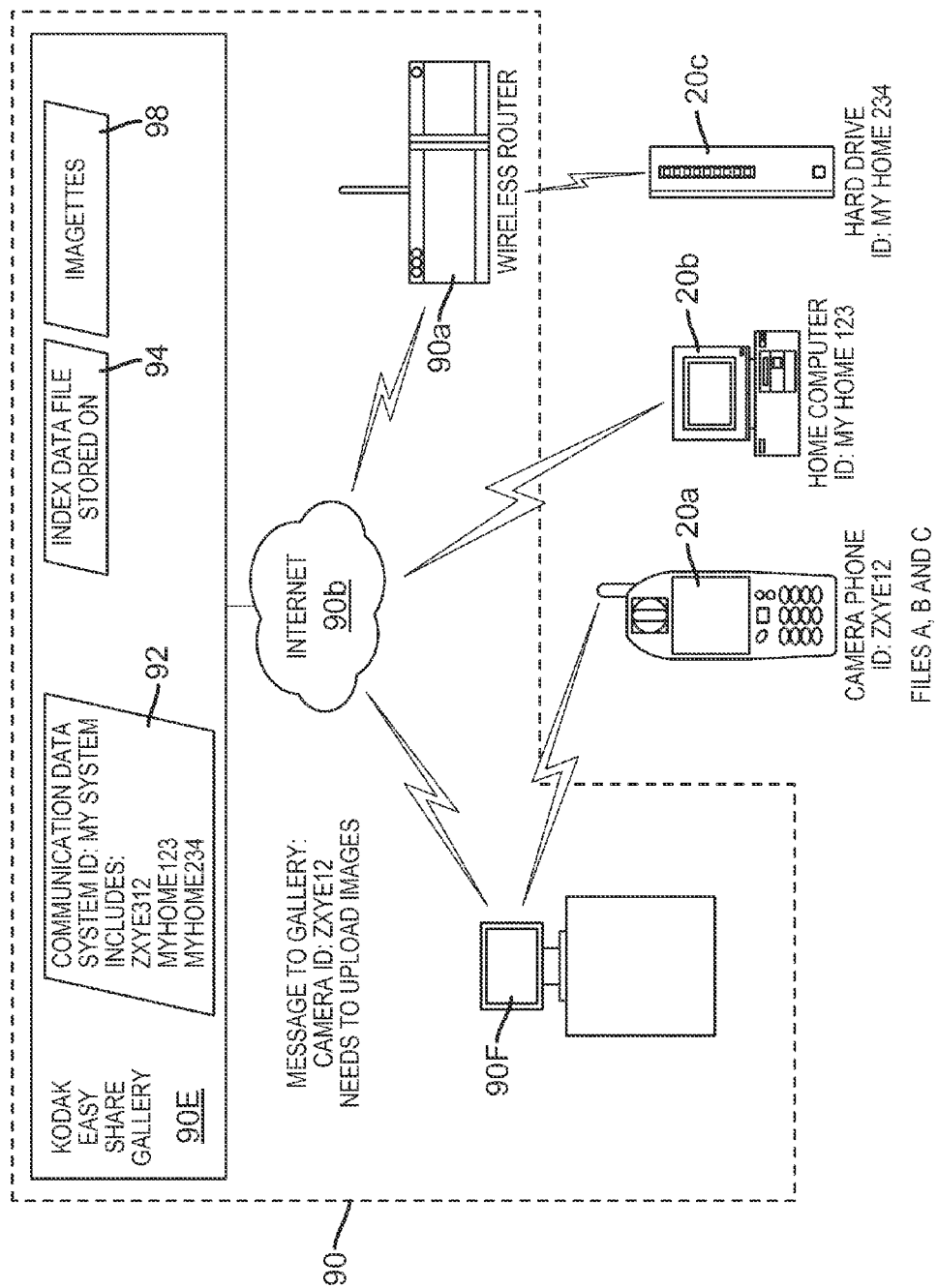
FIG. 12 shows image sharing using another embodiment of the image sharing system.
Figure 13:
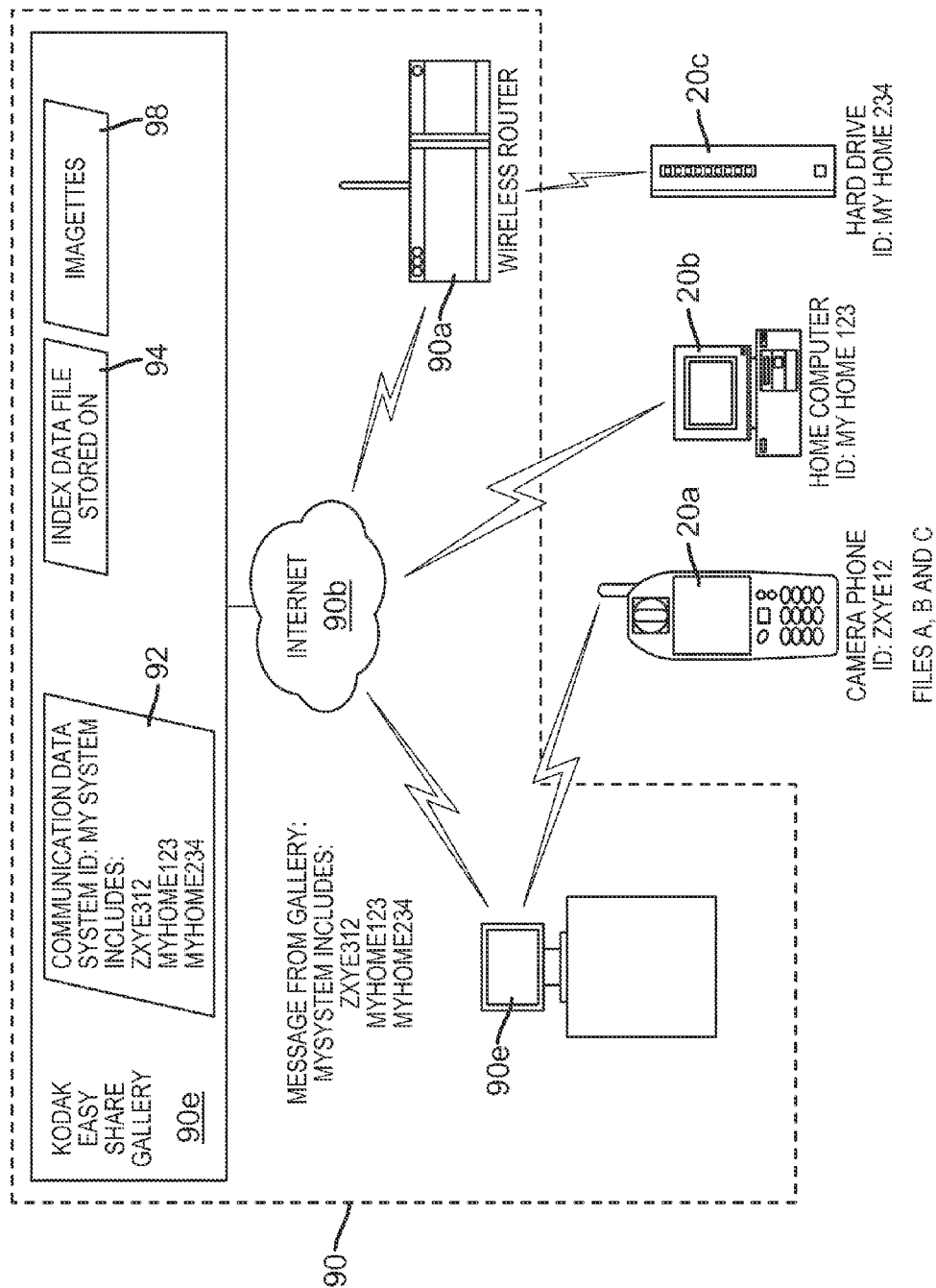
FIG. 13 shows image sharing using another embodiment of the image sharing system.

FIGS. 11-13 shows another embodiment of system 10. In this embodiment an intermediary 90, such as the Kodak EasyShare Gallery 90e, and the Internet 90b are used to monitor and/or guide sharing of image content files between image sharing devices 20a-20c without actually uploading such image content files to the intermediary. In this embodiment, the Kodak EasyShare Gallery 90e is notified when images have been shared between image sharing devices 20a-20n within image sharing system 10. However, intermediary 90 is not necessarily involved in the receipt or transmission of such image content files. Instead, software that is resident in image sharing devices 20a-20c included in image sharing system 10 notifies Kodak EasyShare Gallery 90e of successful and unsuccessful transfers of image content files that are made using communication links, such as Internet 90b, that do not require that the image content files be loaded to the EasyShare Gallery. For example, such image content files include image content files that are transferred using peer-to-peer communication links. In such an embodiment, the intermediary 90, in this case the Kodak EasyShare Gallery 90e and Internet 90b cooperate to monitor the condition of image content data files image and to make notification for corrective action as necessary.

For example, in this embodiment, a user of a cellular picture phone type embodiment of image sharing device 20a wishes to share captured images with associated image sharing devices 20b and 20c comprising a personal computer and a networked hard drive. The user has previously identified that these three image sharing devices 20a-20c are to be included in an image sharing system sponsored by Kodak EasyShare Gallery 90e. This information is stored as communication data 92 at Kodak EasyShare Gallery 90e. However, the user of image sharing device 20a is apart from either of image sharing devices 20b and 20c. Accordingly, the user approaches a Kodak kiosk 90f and establishes a communication session with kiosk 90f. Kiosk 90f is programmed to cooperate with Internet 90b, Kodak EasyShare Gallery 90e to enable communication with image sharing devices 20a-20c in order to form an image sharing system 10. As necessary, any of kiosk 90f, or Internet 90b can temporarily store any of the image content files A-D for a period of time necessary to establish communication with an image sharing device that is not immediately accessible or that cannot otherwise receive an image content file.

Figure 14:
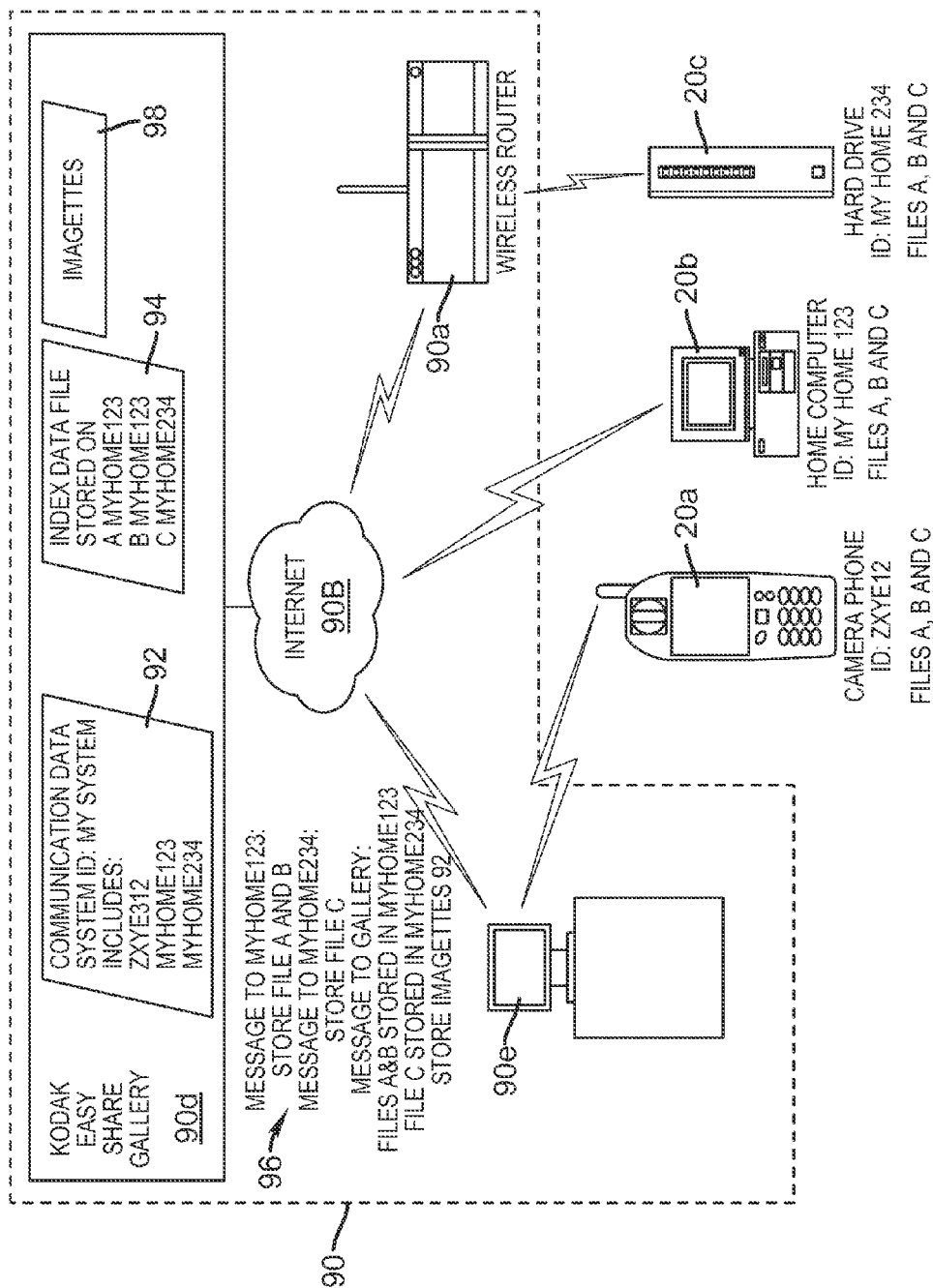
FIG. 14 shows image sharing using another embodiment of the image sharing system.

As shown in FIG. 11, cellular phone image sharing device 20a sends a message asking kiosk 90f to share identified image content files with image sharing system 10. As shown in FIG. 12, kiosk 90f sends a message to Kodak EasyShare Gallery 90e to obtain information about the image sharing system 10 with which image sharing device 20a is associated. As shown in FIG. 13 this information is, in this embodiment, obtained from communication data 92 stored at Kodak Easy-Share Gallery 90e and provided to kiosk 90f. As shown in FIG. 14, manifest data 96 is then generated by kiosk 90f (or alternatively, image sharing device 20a or EasyShare Gallery 90e) that is used in directing copies of image content files A, B, C to image sharing devices 20a-20n in image sharing system 10. Image content files are then loaded from image sharing devices 20a-20n to kiosk 90f and transmitted using Internet 90b to image sharing device 20b and through wireless router 90a to image sharing device 20c.

In this embodiment, image sharing device 20c is capable of communicating directly with wireless router 90a and offers a significant amount of data storage capability. Accordingly, still image files A and B are sent to home computer image sharing device 20b while video image content file C is sent directly to hard drive image sharing device 20c. Optionally, original or imagette forms of still image files A and B can be sent to hard drive image sharing device 20c, while an imagette form of video image content file C can be sent to home computer image sharing device 20b. Similarly, imagettes 98 representing the image content of the image content files stored in image sharing devices 20a-20d can be retained at the Kodak EasyShare Gallery 90e or any other Internet or data hosting site. It will also be appreciated that in this embodiment image content files can be requested by camera phone image sharing device 20a from either of home computer image sharing device 20b or hard drive image sharing device 20c.

In a further embodiment, sharing between image sharing devices is performed directly in a peer-to-peer architecture with the controllers 26 of the various image sharing devices 20a-20n being adapted to perform all steps of any method described herein.

Image Viewing

Figure 15:
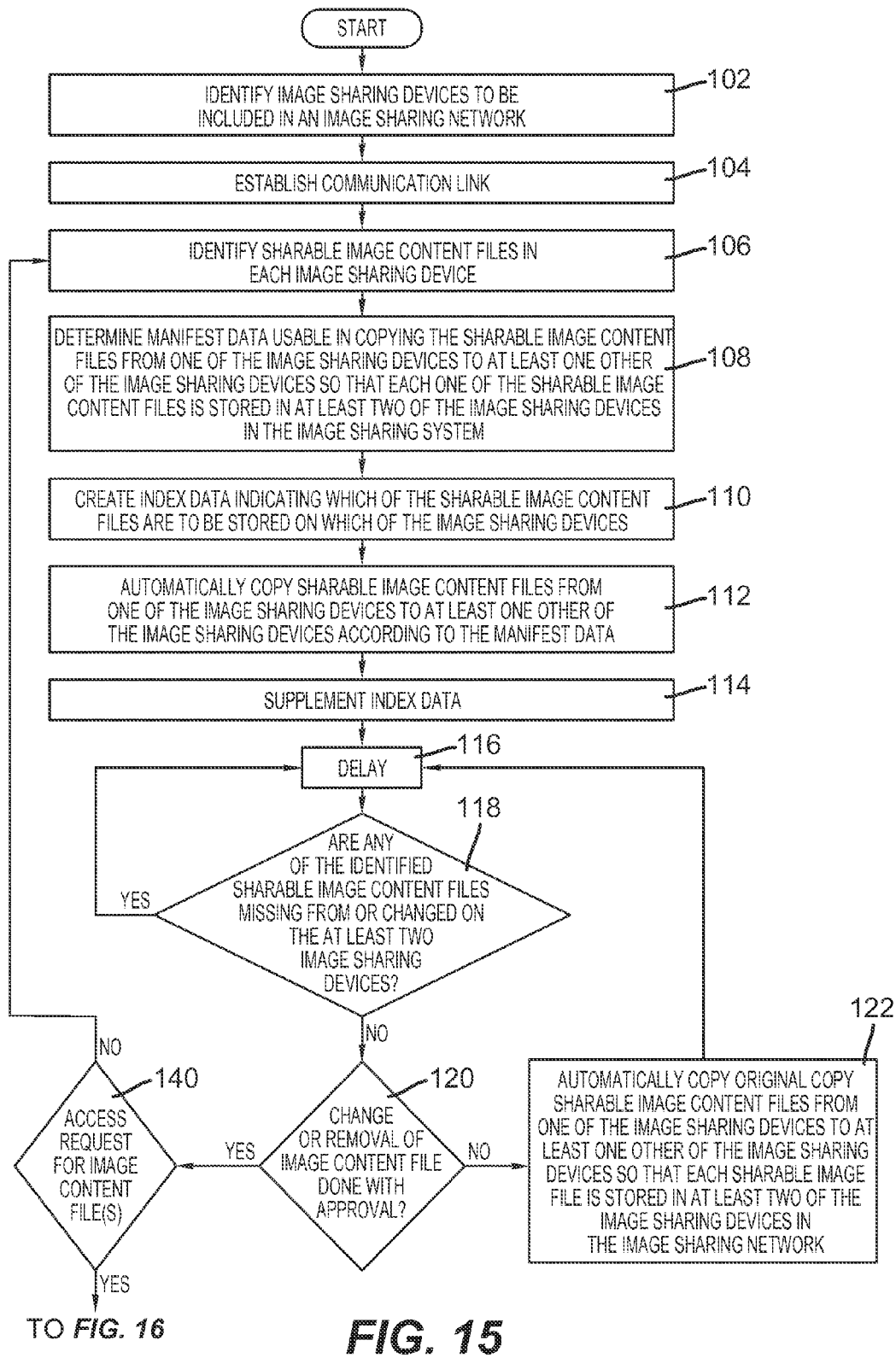
FIG. 15 illustrates one embodiment of a method for using an image sharing system with a step of receiving a request for access to a shared image content file.

FIG. 15 illustrates one embodiment of a method for using an image sharing system 10 that is similar to the embodiment with an additional step of permitting a user to request access to a shared image content file (step 140). Such a request can be entered using a user interface of one of the image sharing devices 20a-20n. Such a request can be automatically made such as at the end of the day or after a known or scheduled event to retrieve and view image content files that are stored therein. Any other criteria can also be used to determine when a user of an image sharing device 10 can be used. When such a request is made, the process turns to the steps illustrated in FIG. 16.

Figure 16:
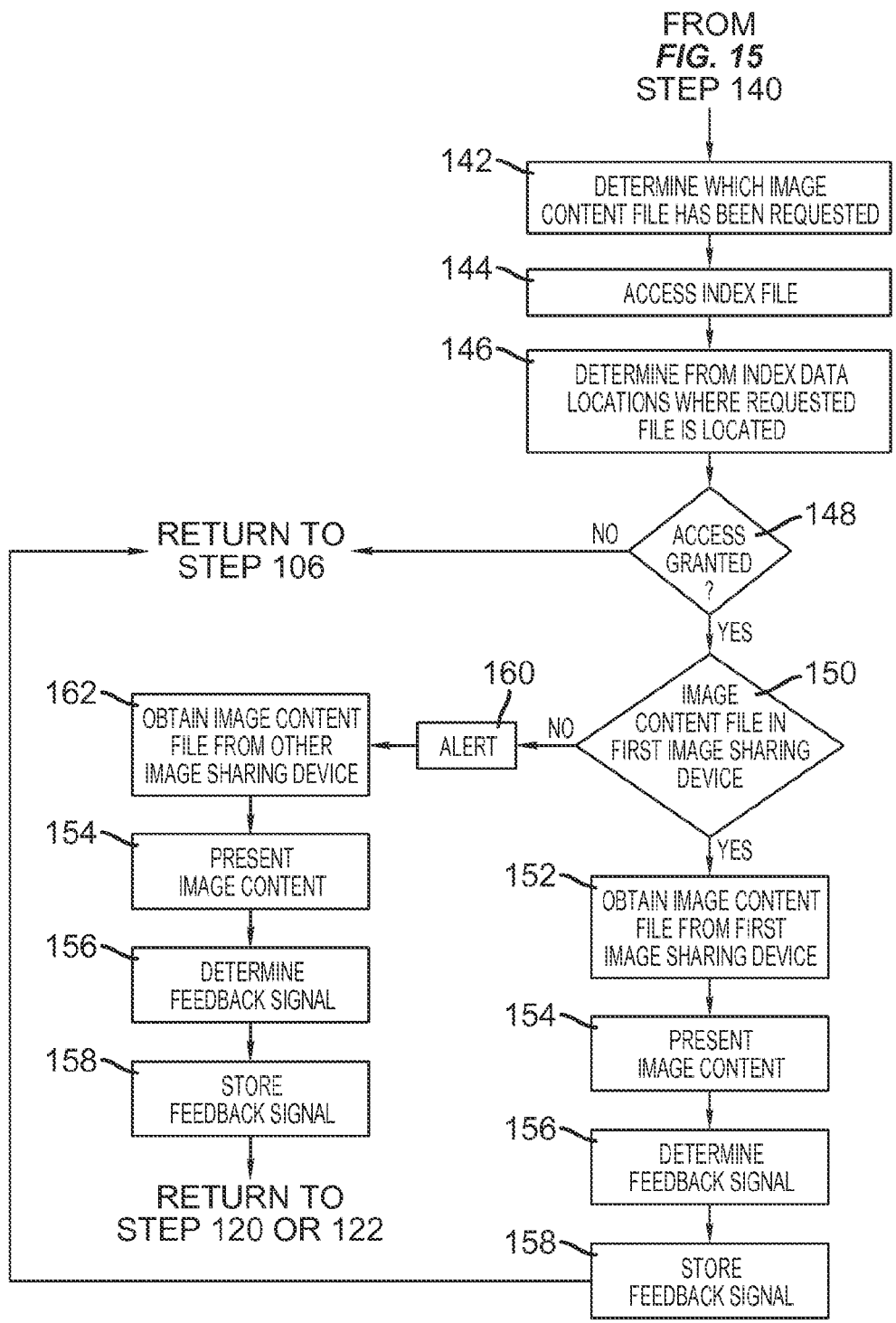
FIG. 16 illustrates a method for answering a request for access to a content image file together with a feedback process.

As is illustrated in FIG. 16, this process includes the steps of determining which image content file has been requested (step 142). In some cases, the request for access to a shared image content file will, itself, include information from which the shared image content file can be identified. However, in other embodiments, a secondary process can be executed in which a request for access to a shared image content file is received and then an inquiry is made as to which of the image content files is to be accessed. A user of the image sharing device can use user interface 60 to make entries identifying the shared image content files such as by typing or speaking a name of the file or by selecting the shared image content file from a menu or list of such shared image content files. In other embodiments a user can make searches for particular image content files using for example and without limitation graphical user interface based searching systems, text based searches, image based searches or searches based upon any other information related to the shared image content files in any way. A user can select particular ones of image content files from the results of such searches. Image content files can be requested or identified individually or optionally in classes, groups, or clusters, or other collections of more than one file. For example, a group of image content files that were captured between a start date and an end date can be requested. In another example, a group of image content files captured by a plurality of image sharing devices 20a-20c can be requested. In still another example, image content files that depict specific content such as a wedding can be requested.

It will be assumed for the purpose of this example that a request has been submitted for access to one identified image content file and after the request for the image content file is received, the index data is accessed (step 144) and the index data is then used to determine which of the image sharing devices 20a-20n in image sharing system 10 have been used to store the identified image content file is stored (step 146).

As is illustrated in the embodiment of FIG. 16, an optional step of determining whether the request to access the image content file will be granted is performed (step 148). In the embodiment that is illustrated the identity of the image sharing device making the request, the identity of the user of the image sharing device making the request for access to the image content file, or other information regarding the requestor, the request itself or the nature of the use for which the image content file is to be put can be compared to supplemental data stored in the index data related to image content file. Such supplemental data can also comprise any other data that can be used to establish the conditions under which access to the image content file will be granted.

As is noted above, access can be controlled by limiting access to index data indicating the location of the image content file that has been requested. Alternatively, access to the actual image content file can be restricted or the image content file can be decrypted and a decryption key that can be used to access the image content file is only provided when access is granted for the image content file. Other known forms of access control to data files can also be used to limit access according to supplemental data.

Where access is not granted the process of FIG. 16 can return to step 106 of FIG. 15. Where access is granted, an effort is made to use the index data to obtain the image content file from one of image sharing devices 20a-20n upon which it is stored (step 150). In this embodiment, this step involves determining whether the requested image content file is located on the image sharing device. As discussed in greater detail above, in other embodiments, this step can involve determining whether the image content file that is stored on the first image sharing device has been changed since it was stored in the first image sharing device.

In this embodiment, if the image content file is found in the first image sharing devices (step 150), then the image content data file is accessed (step 152) and an optional feedback process begins (steps 160-164). In a first portion of the feedback process, image content from the accessed image content file is presented to the requester (step 154) and a feedback signal is determined from one or more of the observers of the presented image content (step 156).

Figure 17:
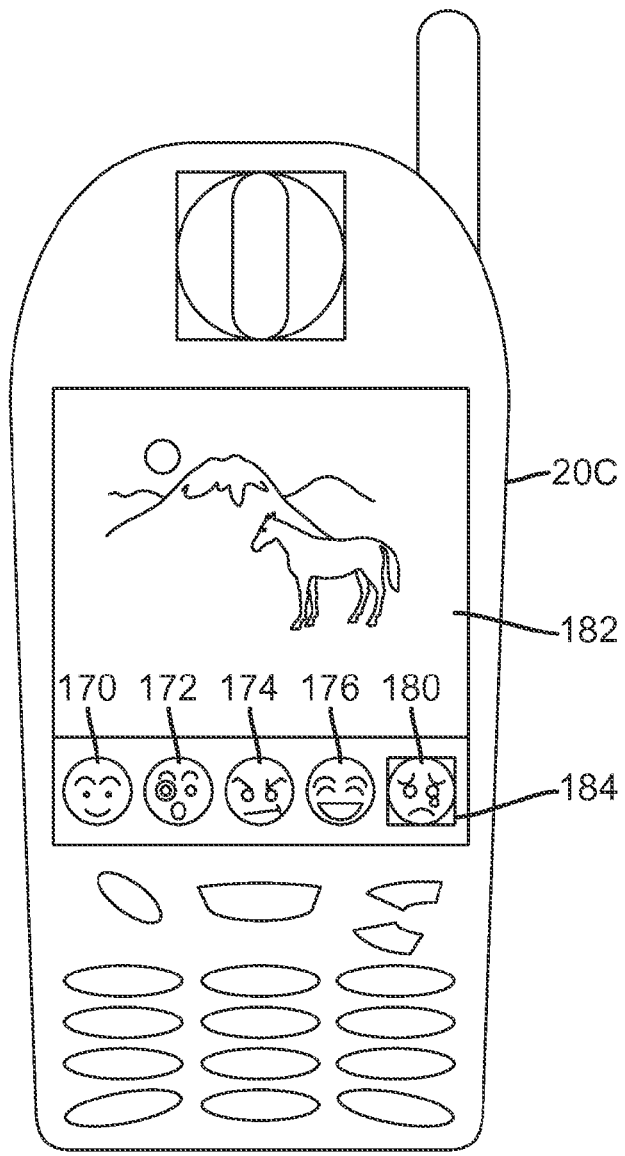
FIG. 17 shows one embodiment of an image sharing device presenting an image and having feedback icons.

The feedback signal can be determined in any of a variety of methods. In one example embodiment, the feedback signal is determined based upon responses that are manually entered or otherwise entered through the user interface 60 of one of image sharing devices 20a-20n. Typically this is done using the user interface 60 of the image sharing devices 20a-20n that is used to present the image content. In the embodiment of FIG. 17, the image sharing device 20c is shown having a plurality of feedback icons 170-180 that a user or viewer can manually select using user interface 60 from during presentation of image content 182 from the requested image content file. Here a selection box 184 can be moved between icons 170-180 to indicate a current selection. It will be appreciated that this example is not limiting and that the feedback signal can be based upon any other known form of detectable user response to the presentation of the image content from an image content file.

Such a response can be voluntary such as the above described icon selection process, or detecting voluntary actions or involuntary actions. Examples of such voluntary actions include, but are not limited to, the amount of time that a user dwells upon the presented image content, the extent to which the user zooms, pans, or makes use of the presented image content or audible responses made by a user to the presented image content and can include, but is not limited to, feedback such as area of interest identified in a shared image content file based upon a user's actions during viewing of the image content file. Examples of involuntary responses comprise but are not limited to matters such as detectable involuntary physiological responses to a presented image, such as increases in blood pressure, galvanic skin response, voice stress, pupil dilation or the like. Sensors 38 of any known design can be incorporated into one or more of image sharing devices 20a-20n and can be adapted to sense such involuntary responses and to generate a feedback signal that is based upon the sensed involuntary responses or conditions that are indicative of such involuntary responses.

The determined feedback signal is then converted into digital feedback data that is logically associated in some manner with the image content file that provoked the actions giving rise to the feedback data and stored (step 158). In one embodiment this can be done by storing all feedback data as supplemental data in the image content file. The feedback data also can be stored as metadata in or in association with each of the image content files. The feedback data can include information from which particular responses can be determined and can optionally indicate the identity of the persons whose actions prompted the generation of the feedback data. Alternatively, the feedback data can be aggregated, summarized, or statistically analyzed or otherwise processed and provided in such an aggregated, summarized, statistically analyzed or otherwise processed form or in a form that is based upon such aggregations summarizations, analyses, or processed information. The feedback data can also be stored in any other logical manner in which data regarding an image content file can be securely stored.

Typically, the feedback data is based upon an emotional response and is affect laden. For example, in the embodiment of FIG. 17, it will be observed that each of the icons is emotionally based. However, less emotion-laden feedback can also be used. For example, feedback data can express non-emotion laden feedback such as confusion, requests for additional information, images that the feedback sender wishes to share with future observers of such image content.

After storage, such feedback data can be made available whenever the image content from the image content file is accessed or presented. For example, an image sharing device can have a controller is adapted to determine when feedback data is associated with an image content file and to cause an human detectable output signal to be generated that is based upon the associated feedback data. In certain embodiments, the feedback data can be presented in an audible form. For example, if the feedback provided was in the form of spoken words, the feedback signal can take the form of an audio signal or other signal that was recorded by the recipient of an image content file. This feedback signal can be converted into feedback data from which an audible signal can be reconstituted and presented using for example audio system 50. Optionally, the resulting audio data can also be associated with visual or other form of user detectable response which can be presented with the audible signal to provide a multimedia response package that enriches the communication.

In other embodiments, for example, discretion can be applied to determine whether to present the audio feedback data in audible from or to use the audible signal to determine other forms of response that may be more accessible, useful or appropriate for the recipient under the circumstances that a person accessing the image content file having the associated image data finds himself or herself in. In circumstances where an audible response may not be appropriate such as where, time, location or preferences dictate that the audible signal cannot be presented the audible feedback data can be used to select icons, animations, tactical responses or other forms of human perceptible feedback that can be generated by an image sharing device 20a-20n. In one example of this type, the audible signal can be used to select between a plurality of available visual-emotional icons, animations or video streams.

The feedback data can of course take other forms without limitation and in a further example can comprise any form of information that can be presented to others in visual form or that can be used as a basis for a visual form of communication, such as video clips or segments, still images, symbols, graphic representations, text alerts or other messages. In one example embodiment, feedback data can comprise an image that is captured of the observer of image content from an image content file. Such an image type feedback data can be presented as captured, or it can be modified or used as a basis for a graphical representation or text based symbol.

Feedback data can be shared with all users of an image content file or it can be shared with selected users of an image content file with information useful in making determinations about who to share such feedback data with being limited according to user preferences or the like which can be stored in the image sharing devices 20a-20n or elsewhere in image sharing system 10. For example, feedback data can be sent by image sharing system 10 to an originator of the image content file, to people who are identified as participating in the image content depicted in an image content file, or who are otherwise identified as being associated with an image content file. The feedback data can also be used for a variety of other purposes such as determining image value of an image content file or image content file retention.

Similarly, involuntary responses that give rise to particular types of feedback data can also be presented in a variety of ways such as by being converted into audio, text or tactile signals. For example, a physiological response such as a galvanic skin response to an image could be sensed and converted in to feedback data indicating that a skin response was detected, with such feedback data being presented as a voice or text message or icon or animation stating or suggesting "That gave me goose bumps!" or similarly blood pressure or hear rate monitoring information could give rise to feedback data that is presented in a text message such as "That made my heart race!"

It will be appreciated that such feedback can be provided with respect to individual images, in which case such feedback data can be logically associated with an individual image content file such as by way of supplemental data stored with the index data or such as by storing feedback data can be stored with the image content files. Additionally, or alternatively, feedback data can be sent to an owner of the image content file. Still further, it will be appreciated that certain groupings of image content files can be the subject of a common feedback and thus, in certain embodiments a user can be permitted to make a single feedback action that creates feedback data that is associated with all of the image content files in a grouping.

At the conclusion of the feedback steps 154-158 the process returns to step 106 of FIG. 15. In this embodiment, if the image content file cannot be found in the first image sharing device, then an alert can optionally be issued (step 160), and the image content file is then obtained from such sources (step 162) the process advances to the feedback process steps 154-158 using the image content file that is stored in the other one of the image content files. However, where this occurs the process does not return to step 106 of FIG. 15 but rather to step 122 or optionally step 120 of FIG. 15.

It will be appreciated that, in generally, any of the image sharing devices 20a-20n in image sharing system 10 can enable communication with other devices outside of image sharing system 10. For example, image sharing device 20c of FIGS. 11-14 can communicate through internet 90c with any of a multiplicity of devices some of which devices may be capable of sharing image content files with the image sharing device 20c. In one embodiment, image sharing device 20c can receive image content files and store such files in image sharing system using the above described image sharing methods and systems. Further, in this situation image sharing device 20c can obtain image content files from other image sharing devices 20a, 20b, in image sharing system 10 and provide these to such non-networked devices. Typically this will be done without advising such external devices as to the existence of or membership in image sharing system 10. However, other approaches can be used, and in some embodiments, owners of image content files can limit the extent to which sharable image content files can be exchanged with others outside of the image sharing system 10.

It will be appreciated that such a system and method can also be used with non-image documents and other forms of data files. In the case of documents, it can also be desirable to encrypt the documents. Encryption may be even desirable in the case of sensitive documents such as tax forms. For example, scans of historical documents could be shared privately with members of the same family.

The invention has been described in detail with particular reference to certain preferred embodiments thereof, but it will be understood that variations and modifications can be effected within the spirit and scope of the invention.

PARTS LIST 10 image sharing system
20a image sharing device
20b image sharing device
20c image sharing device
20d image sharing device
22 transceiver
24 antenna
26 controller
28 imaging system
30 lens system
32 image sensor
34 image processor
36 memory
38 optional sensors
40 display driver
42 video display
50 audio system
52 microphone
54 A/D converter
56 speaker
60 user interface
70 contact detection system
72 contact surface
74 contact circuit
90 intermediary
90a wireless router
90b Internet
90c radio tower
90d router
90e Kodak EasyShare Gallery
90f kiosk
92 communication data
94 index data
96 manifest data
98 imagettes
102 identify image sharing devices to be included in an image sharing system
104 establish communication link
106 identify sharable image content files in at least one of the image sharing devices
108 determine manifest data for use in copying sharable image content files from one of the image sharing devices to at least one other image sharing device
110 create index data indicating which sharable image content was found on which image sharing device
112 automatically copy sharable image content files from one of the image sharing devices to at least one of the image sharing devices
114 supplement index data
116 delay
118 are any identified sharable image content files missing or changed on at least two image sharing devices
118a select image sharing device
118b attempt to communicate with selected image sharing device
118c note communication failure
118d excessive failures
118e warn/adapt
118f all image sharing devices done
118g select another one of the image sharing devices
118h image content files missing or changed on at least two image sharing devices
120 change or removal of image content file done with approval
122 automatically copy original copy sharable image content files
130 resource confirmation
132 alert
134 modify resources
140 access request for image content files
142 determine which image content file has been requested
144 access index data
146 determining from index data locations where requested file is located
148 access granted
150 image content file in first image sharing device
152 obtain image content file from first image sharing device 154 present image content
156 determine feedback signal
158 store feedback signal
160 alert
162 obtain image content file from other image sharing device
170-180 feedback icons
182 present image content
184 selection box
A-D image content file sets

The invention claimed is:

1. A method for operating a plurality of image sharing devices each having a memory with image content files stored therein and a communication system to provide an image sharing system, the method comprising the steps of:
 identifying image sharing devices to be included in the shared image sharing system;
 identifying the data storage capacity available for storing sharable image content files in each of the identified image sharing devices;
 establishing a communication link between the identified image sharing devices, said communication link providing the ability to transfer image content files;
 identifying sharable image content files in each of the image sharing devices;
 determining manifest external from the sharing devices data useable in copying the sharable image content files from one of the image sharing devices to at least one other of the image sharing devices so that each one of the shareable image content files is stored in at least two of the image sharing devices in the image sharing system;
 automatically copying sharable image content files from one of the image sharing devices to at least one other of the image sharing devices according to the manifest data and in accordance with the data storage capacity of the image sharing devices to store the sharable image content files;
 creating index data indicating the at least two image sharing devices in which each sharable image content file is stored;
 subsequently monitoring external from the sharing devices the content of each of the image sharing devices to identify any image sharing device that has a sharable image content stored therein that is missing from the sharable image content that the index data indicates is stored in the image sharing device;
 copying original image content files corresponding to identified missing files from other image sharing devices with the copied image content being selected so that each sharable image content file in the index data is stored in at least two of the image sharing devices; and
 enabling images for viewing on the image sharing device.

2. The method of claim 1, wherein the image content files are stored on at least one of the image sharing devices in an encrypted fashion and further comprising the step of obtaining a decryption key that can be used to access at least some of the image content on the at least one of the image sharing devices and wherein the step of identifying image content stored in the image sharing devices as sharable image content comprises identifying only image content that can be decrypted using the decryption key.

3. The method of claim 1, wherein the image content files are stored on at least one of the image sharing devices with selected image content files provided in a manner that identifies whether such image content files are for archiving and other image content files are identified that are not for sharing and wherein the step of identifying sharable image content stored in the image sharing devices as sharable image content comprises identifying only image content that is identified for sharing.

4. The method of claim 1, further comprising the step of storing the index data in an intermediary device that the image sharing devices can communicate with.

5. The method of claim 1, further comprising the step of generating communication data from which each of the image sharing devices in the image sharing system can be identified.

6. The method of claim 1, wherein the manifest data is determined based upon the image content of the image content files such that image content files having image content that depicts persons, places or things are preferentially stored in image sharing devices that are related to the person, place or thing, or that have a use that is related to the person place or thing, or an image sharing device used by a person who is related to the image sharing device.

7. The method of claim 1, wherein said index data is created by the central server, by a client created query or by automatically updating to the index so that each of the image sharing devices can verify that the index is a current index and that nothing has happened to the server.

8. The method of claim 1, further comprising the steps of receiving a request for access to one of the sharable image content files, obtaining index data for the requested sharable image content file and obtaining the requested sharable image content file from one of the image sharing devices that the index data indicates has the sharable image content file stored thereon.

9. The method of claim 1, further including causing the image sharing devices to communicate with each other at least in part by way of an intermediary and wherein the intermediary provides the control system.

10. The method of claim 1, further including causing the image sharing devices to communicate with each other to exchange image content files and to store the index data in an intermediary.

11. The method of claim 1, further including causing the image sharing devices to communicate with each other and an intermediary that determines manifest data and index data.

12. The method of claim 1 further including determining an owner for each shareable image content file.

13. The method of claim 1, further including requiring each identified image sharing device to commit an amount of memory for image sharing.

14. The method of claim 12 further including requiring approval from the owner to delete or modify a sharable image content file that is associated with the owner.

15. The method of claim 1 further including directing the sharable image files to a combination of the image sharing devices in accordance with the ability of the communication link to share such files.

16. The method of claim 1 further including directing the sharable image files to a combination of the image sharing devices in accordance with providing geographic distribution of image content files.

* * * * *